US008767216B2

(12) United States Patent
Yang et al.

(10) Patent No.: US 8,767,216 B2
(45) Date of Patent: Jul. 1, 2014

(54) HOLOGRAPHICALLY ILLUMINATED IMAGING DEVICES

(75) Inventors: Changhuei Yang, Pasadena, CA (US); Jigang Wu, Irvine, CA (US); Shuo Pang, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 387 days.

(21) Appl. No.: 12/903,650

(22) Filed: Oct. 13, 2010

(65) Prior Publication Data

US 2011/0085219 A1 Apr. 14, 2011

Related U.S. Application Data

(60) Provisional application No. 61/251,237, filed on Oct. 13, 2009, provisional application No. 61/381,389, filed on Sep. 9, 2010.

(51) Int. Cl.
*G01B 9/02* (2006.01)
*G02B 21/16* (2006.01)
*G02B 27/14* (2006.01)
*G02B 26/10* (2006.01)
*G02B 5/32* (2006.01)
*G02B 27/10* (2006.01)
*G02B 21/00* (2006.01)
*G02B 26/00* (2006.01)

(52) U.S. Cl.
CPC .............. *G02B 27/106* (2013.01); *G02B 21/16* (2013.01); *G02B 27/141* (2013.01); *G02B 26/10* (2013.01); *G02B 5/32* (2013.01); *G02B 27/1093* (2013.01); *G02B 21/0076* (2013.01); *G02B 26/004* (2013.01)
USPC ............................................. 356/450; 359/15

(58) Field of Classification Search
CPC ........ G02B 5/32; G02B 5/0252; G02B 5/203; G01B 9/02; G01J 11/00; G01J 9/02
See application file for complete search history.

(56) References Cited

U.S. PATENT DOCUMENTS 4,165,464 A * 8/1979 Ikeda et al. ................... 250/550
4,580,151 A * 4/1986 Bamba .......................... 347/135

(Continued)

FOREIGN PATENT DOCUMENTS

EP 1371965 12/2003
JP 80-015156 1/1996

(Continued)

OTHER PUBLICATIONS

International Search Report and Written Opinion in International Application No. PCT/US2011/025751 mailed on Oct. 25, 2011.

(Continued)

*Primary Examiner* — Jennifer L. Doak
(74) *Attorney, Agent, or Firm* — Sheila Martinez-Lemke; Weaver Austin Villeneuve & Sampson LLP

(57) ABSTRACT

Embodiments of the present invention relate to holographically illuminated imaging devices including a holographic element for transforming an illumination beam into a focal array of light spots, a scanning mechanism for moving an object across one or more light spots in the focal array of light spots, and a light detector for detecting light associated with the focal array of light spots and generating light data associated with the received light.

18 Claims, 9 Drawing Sheets

(56) References Cited

U.S. PATENT DOCUMENTS

| | | | |
|---|---|---|---|
| 4,896,952 A | 1/1990 | Rosenbluth | |
| 4,981,362 A | 1/1991 | DeJong et al. | |
| 5,247,167 A | 9/1993 | Bargerhuff et al. | |
| 5,384,573 A * | 1/1995 | Turpin | 342/179 |
| 5,583,342 A | 12/1996 | Ichie et al. | |
| 5,587,832 A | 12/1996 | Krause | |
| 5,701,008 A | 12/1997 | Ray et al. | |
| 5,795,755 A | 8/1998 | Lemelson | |
| 5,796,112 A | 8/1998 | Ichie | |
| 5,936,764 A | 8/1999 | Kobayashi | |
| 5,973,316 A | 10/1999 | Ebbesen et al. | |
| 6,133,986 A | 10/2000 | Johnson | |
| 6,219,441 B1 | 4/2001 | Hu | |
| 6,248,988 B1 | 6/2001 | Krantz | |
| 6,525,815 B2 | 2/2003 | Kung et al. | |
| 6,628,385 B1 | 9/2003 | Osipchuk et al. | |
| 6,636,300 B2 | 10/2003 | Doemens et al. | |
| 6,646,773 B2 | 11/2003 | Garner | |
| 6,731,391 B1 | 5/2004 | Kao et al. | |
| 6,865,246 B2 | 3/2005 | Yang | |
| 7,045,781 B2 | 5/2006 | Adamec et al. | |
| 7,057,806 B2 | 6/2006 | Atkinson | |
| 7,209,287 B2 | 4/2007 | Lauer | |
| 7,235,777 B2 | 6/2007 | Hecht | |
| 7,250,598 B2 | 7/2007 | Hollingsworth et al. | |
| 7,250,973 B2 | 7/2007 | Dobashi et al. | |
| 7,310,150 B2 | 12/2007 | Guillermo et al. | |
| 7,358,478 B2 | 4/2008 | Price | |
| 7,400,436 B2 | 7/2008 | Hendriks et al. | |
| 7,477,380 B2 | 1/2009 | Knebel et al. | |
| 7,567,346 B2 | 7/2009 | Fomitchov et al. | |
| 7,576,862 B2 | 8/2009 | Cromwell et al. | |
| 7,641,856 B2 | 1/2010 | Padmanabhan et al. | |
| 7,642,536 B2 | 1/2010 | Baer | |
| 7,671,987 B2 | 3/2010 | Padmanabhan et al. | |
| 7,738,695 B2 | 6/2010 | Shorte et al. | |
| 7,751,048 B2 | 7/2010 | Yang et al. | |
| 7,768,654 B2 | 8/2010 | Cui et al. | |
| 7,773,227 B2 | 8/2010 | Yang et al. | |
| 7,982,883 B2 | 7/2011 | Cui et al. | |
| 8,039,776 B2 | 10/2011 | Cui et al. | |
| 8,189,204 B2 | 5/2012 | Cui et al. | |
| 8,314,933 B2 | 11/2012 | Cui et al. | |
| 8,325,349 B2 | 12/2012 | Cui et al. | |
| 8,633,432 B2 | 1/2014 | Pang et al. | |
| 2002/0159047 A1 * | 10/2002 | Dubois | 356/28.5 |
| 2003/0063204 A1 | 4/2003 | Suda | |
| 2003/0203502 A1 | 10/2003 | Zenhausern et al. | |
| 2003/0218756 A1 | 11/2003 | Chen et al. | |
| 2005/0162440 A1 | 7/2005 | Kleen | |
| 2005/0190376 A1 | 9/2005 | Wegmann et al. | |
| 2005/0271548 A1 | 12/2005 | Yang et al. | |
| 2005/0286101 A1 | 12/2005 | Garner et al. | |
| 2006/0013031 A1 | 1/2006 | Ravkin et al. | |
| 2006/0054502 A1 | 3/2006 | Peterman et al. | |
| 2006/0152780 A1 | 7/2006 | Klug et al. | |
| 2007/0086020 A1 | 4/2007 | Han et al. | |
| 2007/0109619 A1 | 5/2007 | Eberl et al. | |
| 2007/0109633 A1 | 5/2007 | Stelzer | |
| 2007/0207061 A1 | 9/2007 | Yang et al. | |
| 2007/0258096 A1 | 11/2007 | Cui et al. | |
| 2007/0277192 A1 | 11/2007 | Hendriks et al. | |
| 2008/0008939 A1 | 1/2008 | Klug et al. | |
| 2008/0049234 A1 | 2/2008 | Seitz | |
| 2008/0121790 A1 | 5/2008 | Grier | |
| 2008/0212430 A1 | 9/2008 | Bakker et al. | |
| 2009/0101836 A1 | 4/2009 | Ohtsuka et al. | |
| 2009/0179142 A1 | 7/2009 | Duparre et al. | |
| 2009/0225319 A1 | 9/2009 | Lee et al. | |
| 2009/0225411 A1 | 9/2009 | Cui et al. | |
| 2009/0225413 A1 | 9/2009 | Stelzer et al. | |
| 2009/0231689 A1 | 9/2009 | Pittsyn et al. | |
| 2009/0276188 A1 | 11/2009 | Cui et al. | |
| 2010/0059696 A1 | 3/2010 | Heintzmann et al. | |
| 2010/0099984 A1 | 4/2010 | Graser | |
| 2010/0195873 A1 | 8/2010 | Cui et al. | |
| 2010/0309457 A1 | 12/2010 | Cui et al. | |
| 2010/0322494 A1 | 12/2010 | Fauver et al. | |
| 2011/0170105 A1 | 7/2011 | Cui et al. | |
| 2011/0181884 A1 | 7/2011 | Cui et al. | |
| 2011/0205339 A1 | 8/2011 | Pavani et al. | |
| 2011/0205352 A1 | 8/2011 | Pavani et al. | |
| 2011/0226972 A1 | 9/2011 | Pang et al. | |
| 2011/0234757 A1 | 9/2011 | Zheng et al. | |
| 2012/0061554 A1 | 3/2012 | Cui et al. | |
| 2012/0098950 A1 | 4/2012 | Zheng et al. | |
| 2012/0223217 A1 | 9/2012 | Zheng et al. | |
| 2012/0228475 A1 | 9/2012 | Pang et al. | |
| 2012/0267515 A1 | 10/2012 | Wu et al. | |

FOREIGN PATENT DOCUMENTS

| | | |
|---|---|---|
| JP | 2003207454 A | 7/2003 |
| JP | 2003524779 A | 8/2003 |
| KR | 10-2005-006253 | 6/2005 |
| WO | WO-0210713 A2 | 2/2002 |
| WO | WO 2004/038484 | 5/2004 |
| WO | WO-2008107702 A1 | 9/2008 |
| WO | WO 2009/111573 | 9/2009 |
| WO | WO 2011/035299 | 3/2011 |
| WO | WO 2011/047053 | 4/2011 |
| WO | WO-2011106324 | 9/2011 |
| WO | WO-2011106327 | 9/2011 |
| WO | WO 2012/122398 | 9/2012 |
| WO | WO 2012/145566 | 10/2012 |

OTHER PUBLICATIONS

International Search Report in International Application No. PCT/US2011/025762 mailed on Oct. 25, 2011.

Written Opinion in International Application No. PCT/US2011/025762 mailed on Oct. 25, 2011.

International Search Report and Written Opinion in International Application No. PCT/US2010/052512 mailed on Apr. 18, 2011.

European Patent Office (EPO) European Supplementary Search Report in EP Application No. 05749488.2 mailed on Jan. 26, 2012.

European Patent Office (EPO) European Supplementary Search Report in EP Patent Application No. 08730664.3 mailed Feb. 7, 2012.

Japanese Patent Office (JPO) Office Action in JPO patent Application No. 2007-515164 (Jul. 26, 2011).

Japanese Patent Office (JPO) Office Action in JPO patent Application No. 2007-515164 (May 8, 2012).

Japanese Patent Office (JPO) Office Action in JPO patent Application No. 2009-553675 (Jan. 24, 2012).

European Patent Office (EPO) Office Action in EP Patent Application No. 05749488.2 mailed on Jun. 27, 2012.

United States Patent and Trademark Office (USPTO) Office Action in U.S. Appl. No. 12/398,050 mailed on Nov. 14, 2011.

United States Patent and Trademark Office (USPTO) Notice of Allowance in U.S. Appl. No. 12/398,050 mailed on Jul. 17, 2012.

United States Patent and Trademark Office (USPTO) Office Action in U.S. Appl. No. 12/398,098 mailed on May 25, 2011.

United States Patent and Trademark Office (USPTO) Restriction Requirement in U.S. Appl. No. 12/399,823 mailed on Aug. 10, 2011.

United States Patent and Trademark Office (USPTO) Non-Final Office Action in U.S. Appl. No. 12/399,823 mailed on Nov. 14, 2011.

United States Patent and Trademark Office (USPTO) Final Office Action in U.S. Appl. No. 12/399,823 mailed on May 25, 2012.

"Beam Steering Using Liquid Crystals," Boulder Nonlinear Systems, downloaded from the Internet at http://www.bnonlinear.com/papers/LCBeamSteering.pdf, May 8, 2001.

"Talbot Effect," Wikipedia, last modified Dec. 27, 2011.

"Nipkow Disk" Wikipedia, last modified Aug. 13, 2010.

Bates et al, "Multicolor super-resolution imaging with photo-switchable fluorescent probes," Science 317, 1749-1753 (2007).

Besold, G. and Lindlein, "Fractional Talbot effect for periodic microlens arrays", Optics Engineering, vol. 36, pp. 1099-1105 (Apr. 1997).

Betzig, E., et al.,"Imaging intracellular fluorescent proteins at nanometer resolution," Science, vol. 313, pp. 1642-1645 (2006).

(56) References Cited

OTHER PUBLICATIONS

Bishara et al., "Lensfree on-chip microscopy over a wide field-of-view using pixel super-resolution," Opt. Expr. 18, pp. 11181-11191 (2010).
Chalut, K. J., et al., "Quantitative phase microscopy with asynchronous digital holography," Optics EXpress, vol. 15, pp. 3047-3052 (2007).
Conchello, Jose-Angel, and Lichtman, Jeff W., "Optical sectioning microscopy," Nature Methods, vol. 2, No. 12, pp. 920-931 (Dec. 2005).
Cui, Xiquan, et al., "Lensless high-resolution on-chip optofluidic microscopes for *Caenorhabditis elegans* and cell imaging," Proceedings of the National Academy of Sciences of the Unities States of America, vol. 105, pp. 10670-10675 (2008).
Di Mambro et al., "Sharpness limitations in the projection of thin lines by use of the Talbot experiment," J. Opt. Soc. Am. A 21, pp. 2276-2282 (2004).
Eah et al., "Nearly diffraction-limited focusing of a fiber aXicon microlens," Rev. Sci. Instrum. 74(11), 4969-4971 (2003).
Frey, H.G., et al.,"High-resolution imaging of single fluorescent molecules with the optical near-field of a metal tip," Phys. Rev. Let. 93, 200801 (2004).
Giloh et al., "Fluorescence microscopy: reduced photobleaching of rhodamine and fluorescein protein conjugates by n-Propyl Gallate," Science 217, pp. 1252-1255 (1982).
Grosjean et al., "Fiber MicroaXicons Fabricated by a Polishing Technique for the Generation of Bessel-Like Beams," Applied Optics 46(33) 8061-8063 (2007).
Heng, Xin, et al., "An Optical Tweezer Actuated, Nanoaperture-grid based Optofluidic Microscope Implimentation Method," Optics EXpress, vol. 15, No. 25, 16367-75 (2007).
Heng, Xin, et al., "Optofluidic Microscopy—a method for implementing a high resolution optical microscope on a chip," Lab Chip, vol. 6, pp. 1274-1276 (2006).
Ho, J., et al., "Use of whole slide imaging in surgical pathology quality assurance: design and pilot validation studies," Human Pathology 37, pp. 322-331 (2006).
Kimura, Yasuo, et al., "Compact optical head using a holographic optical element for CD players," Appl. Opt. 27, pp. 668-671 (1988).
Lee, Lap Man, et al., "The Application of On-Chip Optofluidic Microscopy for Imaging *Giardia lamblia* Trophozoites and Cysts," Biomed Microdevices, Springer DOI 10.1007/s10544-009-9312-X (2009).
Leger, J.R., et al, "Efficient array illuminator using binary-optics phase plates at fractional-Talbot planes," Optics Letters 15, pp. 288-290 (1990).
Lohmann, A.W. and Silva D.E., "An Interferometer based on the Talbot Effect," Optics Communications, vol. 2, No. 9, pp. 413-415 (Feb. 1971).
Marquet, Pierre, et al., "Digital holographic microscopy: a noninvasive contrast imaging technique allowing quantitative visualization of living cells with subwavelength aXial accuracy," Optics Letters, vol. 30, No. 5, pp. 468-470 (Mar. 2005).
Miao, Qin, et al., "Dual-modal three-dimensional imaging of single cells with isometric high resolution using an optical projection tomography microscope," Journal of Biomedical Optics, vol. 14 (2009).
Merenda, F., et al., "Miniaturized high-NA focusing-mirror multiple optical tweezers," Opt. EXp. 15, 6075-6086 (2007).
Montgomery, W.D., "Self-Imaging Objects of Infinite Aperture," J. Opt. Soc. Am., vol. 57, pp. 772-775 (1967).
Oheim, "High-throughput microscopy must re-invent the microscope rather than speed up its functions," Brit, J. Pharm. 152, op. 1-4 (2007).
Pang, Sean, et al., "Implementation of a color-capable optofluidic microscope on a RGB CMOS color sensor chip substrate," Lab on a Chip, vol. 10, pp. 411-414 (2010).
Patorski, "The self-imaging phenomenon and its applications," Progress in Opt. 27, pp. 3-108 (1989).
Pfeiffer, F., et al., "Hard-X-ray dark-field imaging using a grating interferometer," Nature Materials 7, pp. 134-137 (2008).
Pfeiffer, Franz, et al., "Phase retrieval and differential phase-contrast imaging with low-brilliance X-ray sources," Nat. Phys, vol. 2, pp. 258-261 (published online on Mar. 26, 2006).
Planchon, et al., "Rapid three-dimensional isotropic imaging of living cells using Bessel beam plane illumination," Nat. Methods 8(5) (2011).
Rojo, et al., "Critical comparison of 31 commercially available digital slide systems in pathology," Int'l J. Surg. Path. 14, pp. 285-305 (2006).
Sanchez, E.J., et al., "Near-field fluorescence microscopy based on two-photon eXcitation with metal tips," Phys. Rev. Let. 82, 4014 (1999).
Talbot, "LXXVI Facts relating to optical science. No. IV," Philosophical Magazine Series 39, pp. 401-407 (1836).
Tao et al., "The generation of an array of nondiffracting beams by a single composite computer generated hologram," J. Opt. A: Pure Appl. Opt. 7, 40-46 (2005).
Titus, Charles M., et al., "Efficient, Accurate Liquid Crystal Digital Light Deflector," Proc. SPIE, vol. 3633(1), pp. 244-253 (Jun. 1999).
Tsien, Roger, et al., "Fluorophores for Confocal Microscopy: Photophysics and Photochemistry," Handbook of Biological Confocal Microscopy, third edition, Springer Science + Business Media, pp. 38-352 (2006).
Turunen, et al., "Holographic generation of diffraction-free beams," Appl. Opt. 27(19), 3959-3962 (1988).
Wu, et al., "Focal Plane tuning in Wide Field-of-view Microscope with Talbot Pattern Illumination," Opt. Lett. 36, 2179-2181 (2011).
Wu, J., et al., "Focus grid generation by in-line holography," Optics Express, vol. 18, p. 14366-14374 (2010).
Wu, J., Cui, X., Lee, L. M., and Yang, C., "The application of Fresnel zone plate based projection in optofluidic microscopy," Opt. Exp. 16, 15595 (2008).
Wu, J., et al., "Wide field-of-view microscope based on holographic focus grid illumination," Optics Letters, vol. 35, No. 13 (2010).
Zapata-Rodriguez, Carlos, et al., "Three-dimensional Field Distribution in the Focal Region of Low-Fresnel-Number AXicons," F. Opt. Soc. Am. A 23(12) 3016-3017 (2005).
Zheng, G.A., et al., "Sub-pixel resolving optofluidic microscope for on-chip cell imaging," Lab on a Chip, vol. 10, pp. 3125-3129 (2010).
Zheng, G., et al., "Supplementary Information for: Sub-pixel resolving optofluidic microscope for on-chip cell imaging," Lap Chip, vol. 10 (2010).
Zhu et al., "Generation of controllable nondiffracting beams using multimode optical fibers," Appl. Phys. Lett. 94, 201102 (2009).
Wu, Jigang, et al., "Focal plane tuning in wide-field-of-view microscope with Talbot pattern illumination," Optics Letters 36 (12), pp. 2179-2181 (2011).
Zheng, Guoan, "The ePetri dish, an on-chip cell imaging platform based on subpixel perspective sweeping microscopy (SPSM)," Proceedings of the National Academy of Science 108 (41), pp. 16889-16894 (2011).
Pang, Shuo, et al., "Fluorescence microscopy imaging with a Fresnel zone plate array based optofluidic microscope," Lab on a Chip 11, 3698-3702, (2011).
United States Patent and Trademark Office (USPTO) Restriction Requirement in U.S. Appl. No. 12/398,050 dated on Aug. 10, 2011.
United States Patent and Trademark Office (USPTO) Notice of Allowance in U.S. Appl. No. 12/398,050 dated on Aug. 28, 2012.
United States Patent and Trademark Office (USPTO) Office Action in U.S. Appl. No. 12/638,518 dated on Jan. 12, 2012.
United States Patent and Trademark Office (USPTO) Notice of Allowance in U.S. Appl. No. 12/638,518 dated on Feb. 14, 2012.
United States Patent and Trademark Office (USPTO) Notice of Allowance in U.S. Appl. No. 12/638,518 dated on Apr. 23, 2012.
United States Patent and Trademark Office (USPTO) Notice of Allowance in U.S. Appl. No. 12/638,518 dated on Aug. 24, 2012.
United States Patent and Trademark Office (USPTO) Notice of Allowance in U.S. Appl. No. 12/886,779 dated on May 22, 2013.
United States Patent and Trademark Office (USPTO) Notice of Allowance in U.S. Appl. No. 12/886,779 dated on Aug. 27, 2013.

(56) References Cited

OTHER PUBLICATIONS

PCT International Search Report dated Apr. 23, 2009 issued in PCT/US2009/036045.
PCT Written Opinion dated Apr. 23, 2009 issued in PCT/US2009/036045.
PCT International Preliminary Report on Patentability and Written Opinion dated Sep. 16, 2010 issued in PCT/US2009/036045.
European Search Report dated Feb. 11, 2013 issued in EP 09 716 850.4.
PCT International Search Report and Written Opinion dated Apr. 29, 2011 issued in PCT/US2010/049647.
PCT International Preliminary Report on Patentability and Written Opinion dated Apr. 5, 2012 issued in PCT/US2010/049647.
PCT International Preliminary Report on Patentability and Written Opinion dated Apr. 26, 2012 issued in PCT/US2010/052512.
PCT International Preliminary Report on Patentability and Written Opinion dated Sep. 7, 2012 issued in PCT/US2011/025751.
PCT International Preliminary Report on Patentability dated Sep. 7, 2012 issued in PCT/US2011/025762.
PCT International Search Report and Written Opinion dated Sep. 3, 2012 issued in PCT/US2012/028328.
PCT International Preliminary Report on Patentability and Written Opinion dated Sep. 19, 2013 issued in PCT/US2012/028328.
PCT International Search Report and Written Opinion dated Nov. 28, 2012 issued in PCT/US2012/034339.
PCT International Preliminary Report on Patentability and Written Opinion dated Oct. 31, 2013 issued in PCT/US2012/034339.
Confocal Microscopy, Wikipedia, last modified Aug. 25, 2010, 3 pages.
Confocal Raman Microscopy (Oct. 2006) "Optofluidic Microscope Enables Lensless Imaging of Microorganisms," *Biophotonics International*, 13(10):24.
Types of confocal microscopy, downloaded from the Internet at http://www.mikriskipie.org/2008/01/26/types-of-confocal-microscopy/14/ on Sep. 10, 2010.
Brockie et al., (Mar. 1, 2001) "Differential Expression of Glutamate Receptor Subunits in the Nervous System of *Caenorhabditis elegans* and Their Regulation by the Homeodomain Protein UNC-42," *The Journal of Neuroscience*, 21(5):1510-1522.
Chovin, Arnaud, et al., (2004) "Fabrication, Characterization, and Far-Field Optical Properties of an Ordered Array of Nanoapertures," *Nano Letters*, 4(10):1965-68.
Coskun, A.F., et al., (Sep. 7, 2011). "Wide-field lensless fluorescent microscopy using a tapered fiber-optic faceplate on a chip," *Analyst*, pp. 3512-3518.
Cui, X. et al., (Jan. 2006) "Portable Optical microscope-on-a-chip," *Photonics West*, San Jose, CA, 8pp.
Cui, Xiquan, et al., (2008) "Quantitative differential interference contrast microscopy based on structured-aperture interference," *Applied Physics Letters*, 93:091113-1-091113-3.
Cui, Xiquan, et al., (2006) "Slanted hole array beam profiler (SHArP)—a high-resolution portable beam profiler based on a linear aperture array," *Optics Letters*, 31(21):3161-3163.
Garcia-Sucerquia, J. et al., (2006) "Immersion digital in-line holographic microscopy," *Optics Letters*, 31:1211-1213.
Goodman et al., (2005) "Holography," Chapter 9: pp. 297-393, *Introduction to Fourier Optics*, 3rd Edition, Roberts & Company Publishers.
"High Refractive Index/Low Refractive Index Resins", NTT AT, downloaded from the Internet at http://www.ntt-at.com/product/hl_resins/ [retrieved on Jun. 12, 2013], 3pp.
Lange et al., (2005) "A microfluidic shadow imaging system for the study of the nematode *Caenorhabditis elegans* in space," *Sensors and Actuators B*, 107:904-914.
Mudanyali, O., et al., (Jun. 7, 2010) "Compact, light-weight and cost-effective Microscope based on Lensless Incoherent Holography for Telemedicine Applications," *Lab on a Chip*, 10:1417-1428, 25 pp.
Nozokido, Tatsuo, et al., (2001) "Scanning Near-Field Millimeter-Wave Microscopy Using a Metal Slit as a Scanning Probe," *IEEE Transactions on Microwave Theory and Techniques*, 49(3):491-99.
Ottevaere et al., (2006) "Comparing glass and plastic refractive microlenses fabricated with different technologies," *Journal of Optics a-Pure and Applied Optics*, 8(7):S407-S429.
Pang et al., (Jun. 17, 2013) "Wide Field of View Talbot grid-based microscopy for multicolor fluorescence imaging," *Optic Express*, 21(12):14555-14565.
Repetto L., et al., (2004) "Lensless digital holographic microscope with light-emitting diode illumination," *Opt. Lett.*, 29:1132-1134.
Richard et al., (2009) "An integrated hybrid interference and absorption filter for fluorescence detection in lab-on-a-chip devices," *Lab on a Chip*, 9:1371-1376.
Seo, et al., (2009) "Lensfree holographic imaging for on-chip cytometry and diagnostics," *Lab on a Chip*, 9:777-787.
Slavich "Technical specifications of holography materials," downloaded from the Internet at http://www.slavich.com/holo_summary [retrieved on Jun. 12, 2013], 2pp.
Tam et al., (May 24, 2004) "An imaging fiber-based optical tweezer array for microparticle array assembly," *Appl. Phys. Lett.*, 84(21):4289-4291.
Tsien, Roger, et al., (1998) "The green fluorescent protein," *Annual Review of Biochemistry*, 67:509-544.
Wang et al., (2009) "Characterization of acceptance angles of small circular apertures," *Optics Express* 17(26):23903-23913.
United States Patent and Trademark Office (USPTO) Non-Final Office Action in U.S. Appl. No. 13/032,449 dated on Mar. 7, 2014.
United States Patent and Trademark Office (USPTO) Non-Final Office Action in U.S. Appl. No. 13/032,529 dated on Feb. 13, 2014.
Dubey et al., (2007) "Wavelength-scanning Talbot effect and its application for arbitrary three-dimensional step-height measurement," *Optics Communications*, 279:13-19.
Pang et al., (Dec. 1, 2012) "Wide and Scalable Field-of View Talbot-Grid-Based Fluorescence Microscopy," *Optic Letters* 37(23):5018-5020.

\* cited by examiner

HOLOGRAPHICALLY ILLUMINATED IMAGING DEVICES

CROSS-REFERENCES TO RELATED APPLICATIONS

This is a non-provisional application of and claims priority to U.S. Provisional Patent Application No. 61/251,237 entitled "Approaches for Building Compact Fluorescence Microscopes" filed on Oct. 13, 2009 and to U.S. Provisional Patent Application No. 61/381,389 entitled "Fluorescence Optofluidic Microscope" filed on Sep. 9, 2010. These provisional applications are hereby incorporated by reference in their entirety for all purposes.

This non-provisional application is related to the following co-pending and commonly-assigned patent applications, which are hereby incorporated by reference in their entirety for all purposes:
- U.S. patent application Ser. No. 12/398,050 entitled "Optofluidic Microscope Device with Photosensor Array" filed on Mar. 4, 2009.
- U.S. patent application Ser. No. 12/399,823 entitled "Scanning Illumination Microscope" filed on Mar. 6, 2009.
- U.S. patent application Ser. No. 12/886,779 entitled "Reflective Focusing and Transmissive Projection Device" filed on Sep. 21, 2010.

BACKGROUND OF THE INVENTION

Embodiments of the present invention generally relate to sensing and imaging devices. More specifically, certain embodiments relate to holographically illuminated imaging devices used in microscopy and photography.

Microscopes and other optical microscopy devices are used extensively in modern biomedicine and bioscience. Typically, conventional microscopes include an objective lens, a platform for supporting a specimen, and an eyepiece containing lenses for focusing images. These conventional microscope designs have bulky optics, and have proven to be expensive and difficult to miniaturize. Further, since high resolution objective lenses have a limited field of view, the specimen stage must be moved to increase the scope of the view, which can be time-consuming.

A conventional confocal laser scanning microscope uses a laser beam to provide light which is focused by an objective lens into a small focal volume at the specimen. Scattered and reflected laser light as well as any fluorescence light from the illuminated spot on the specimen is collected by the objective lens. The collected light is transmitted to a beam splitter which separates out the light of interest and transmits it to a detection apparatus. As the laser scans, an image can be obtained of the specimen. This technique can be time-consuming.

BRIEF SUMMARY OF THE INVENTION

Embodiments of the present invention relate to holographic illumination in sensing and imaging devices. More specifically, certain embodiments relate to holographically illuminated imaging devices (HIIDs) having a holographic element to transform a planar wavefront from an illumination beam into at least one focal array of light spots in a fluid channel. A fluid flow moves an object through the light spots in the fluid channel. The object alters the light (e.g., fluorophores absorb light and emit light of a different light property). A light detector detects the altered light (e.g., emissions) and generates time varying data which can be used to produce an image of the object. One embodiment includes an HIID with a plurality of focal arrays along the fluid channel at different depths, forming a three-dimensional focal array. This configuration can be used to generate sectional images or three-dimensional images of the object moving through the fluid channel.

One embodiment is directed to a HIID comprising a holographic element configured to transform an illumination beam from an illumination source into a focal array of light spots. The HIID further comprises a scanning mechanism configured to move an object across one or more light spots in the focal array of light spots. The HIID further comprises a light detector configured to detect light associated with the focal array of light spots, and generate light data associated with the received light.

Another embodiment is directed to a HIID comprising a body defining a fluid channel. The HIID further comprises a holographic element configured to transform an illumination beam from an illumination source into a focal array of light spots. The HIID further comprises a beam splitter configured to reflect the focal array of light spots into the fluid channel wherein a flow in the channel moves an object across one or more light spots in the focal array of light spots. The beam splitter is further configured to transmit light altered by the object. The HIID further comprises a light detector configured to detect light associated with the focal array of light spots, and generate light data associated with the received light.

Another embodiment is directed to a HIID comprising a holographic element configured to transform an illumination beam into a plurality of focal arrays of light spots at different focal planes. The HIID further comprises a scanning mechanism configured to move an object across one or more light spots in the plurality of focal arrays of light spots. The HIID further comprises a light detector configured to receive light associated with the plurality of focal arrays of light spots, and generate light data associated with the received light.

Another embodiment is directed to a system comprising a HIID and a processor. The HIID includes a holographic element configured to transform an illumination beam from an illumination source into a focal array of light spots. The HIID also includes a scanning mechanism configured to move an object across one or more light spots in the focal array of light spots. The HIID also includes a light detector configured to detect light associated with the focal array of light spots, and generate light data associated with the received light. The HIID also includes a processor in communication with the light detector. The processor is configured to receive a signal with light data and generate an image of the object based on the light data.

DETAILED DESCRIPTION OF THE INVENTION

Figure 1:
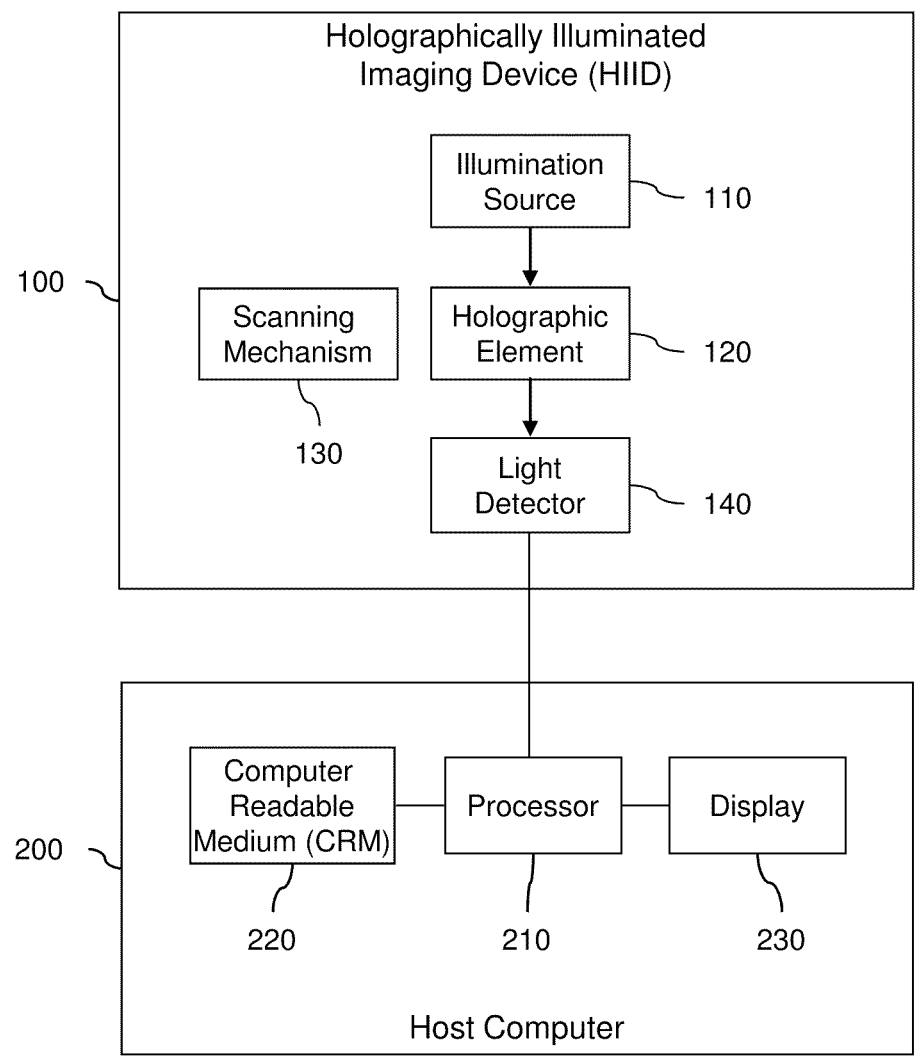
FIG. 1 is a block diagram of components of an HIID system, in accordance with embodiments of the disclosure.

Embodiments of the present invention will be described below with reference to the accompanying drawings. One embodiment includes an HIID having a holographic element for illuminating a fluid channel carrying an object being imaged. The holographic element transforms a planar wavelength of an illumination beam into an array of spherical wavefront or approximately spherical wavefront to form a focal array of tightly confined light spots diagonally extending across the fluid channel. As the object moves past light spots, the light is altered (e.g., fluorophores absorb light and emit light of a different property). A differentiating element transmits the altered light (e.g., emissions) to a light detector which generates time varying data, which is used to generate images (e.g., fluorescent images) of the object.

Some conventional imaging systems use a lens array to channel uniform light into light spots. The spacing between the light spots is restricted by the diameter of the lens. For example, to create an array of light spots with a spacing of 30 micron using an appropriate lens array, each lens would have about a 30 micron diameter. The numerical aperture of each lens is also limited by the lens diameter.

The HIID of embodiments does not have these restrictions because it uses a holographic element. A holographic element can represent a series of overlapping effective 'lenses.' The effective 'lenses' can channel an illumination beam into overlapping focal cones and into light spots. Since the focal cones overlap, the spacing between the light spots is not dependent on the diameter of the effective 'lens.' The holographic element can also have a much higher achievable numerical aperture than a lens array and may be capable of generating higher resolution images. Examples of holographic elements that generate light spots can be found in Wu, Jigang, Cui, Xiquan, Zheng, Guoan, Wang, Ying Min, Lee, Lap Man, Yang, Changhuei, "Wide field-of-view microscope based on holographic focus grid illumination," Optics Letters, Vol. 35, No. 13, Jul. 1, 2010, which is hereby incorporated by reference in their entirety for all purposes.

The HIIDs of embodiments of the invention provide one or more advantages. One advantage is that the HIID provides more localized illumination which can improve image resolution. Since the holographic element does not have the same physical restrictions of a lens array, the holographic element may be able to generate tighter focused light spots in a shorter focal length, which can allow for higher resolution images. In a microfluidic flow application (e.g., an optofluidic microscope), a holographic element may provide tightly focused lights spots within the short width of a fluid channel, which can provide better illumination than conventional systems. This improved illumination can result in higher resolution images. In some embodiments, image resolution of less than 0.6 micron can be achieved. Another advantage is that the HIID has more effective usage of a given illumination beam (e.g., excitation light) than conventional imaging devices. The use of a holographic element allows for effective channeling of the light power in an illumination beam into tightly confined light spots. In some embodiments, a holographic element of an HIID may be able to channel up to 47% of an illumination beam into the light spots. Some embodiments may be able to provide a local light intensity at the light spots of values of about $3 \times 10^4$ W/cm$^2$. Another advantage is that the HIID has few components in a simple multi-layered structure that can be fabricated in an on-chip design. Since the HIID can be designed in a multilayered structure, the device can be an on-chip design inexpensively fabricated using standard semiconductor and micro/nanofabrication procedures. A multi-layered on-chip design can also be easily miniaturized. Another advantage is that the HIID can employ microfluidic flow for high throughput analyses and imaging. These microfluidic flow methods can also be highly automated. Another advantage is that an HIID has the flexibility of being designed with a focal plane away from the surface a fluid channel in a microfluidic flow application. The HIID can be designed to locate the focal plane of the light spots at any arbitrary height within the fluid channel so that the high resolution images can be generated any arbitrary height. This flexibility is useful as it frees the restriction of having to flow specimens with the objects close to either the channel floor or ceiling for good image acquisition.

I. HIID System

FIG. 1 is a block diagram of components of an exemplary HIID system 10, in accordance with embodiments of the disclosure. The HIID system 10 includes an HIID 100 communicatively coupled to a host computer 200. Although the illustrated embodiment includes a single HIID 100 and a single host computer 200, other embodiments may include two or more HIIDs 100 and/or host computers 200.

The HIID 100 includes an illumination source 110, a holographic element 120, a scanning mechanism 130 and a light detector 140. The holographic element 120 transforms a wavefront of an illumination beam (shown in FIG. 2(a)) by the illumination source 110 into an array of converging spherical wavefront to form a focal array of light spots 114 (shown in FIG. 2(b)) to illuminate an object 150 (shown in FIG. 2(a)) being imaged by the HIID 100. Although many embodiments show an array of converging spherical wavefront, approximately spherical wavefront or other wavefront with well separate structure can be used in other embodiments. The scanning mechanism 130 moves the focal array of light spots relative to the object 150 or move the object 150 relative to the focal array of light spots. The light detector 140 light altered (e.g., blocked, reduced intensity, and/or modified wavelength or other light property) by the object 150. The light detector 140 generates light data associated with light received by the light detector 140. Although the illustrated embodiment includes a single illumination source 110, a single holographic element 120, a single scanning mechanism 130 and a single light detector 140, other embodiments may include any suitable number of these components.

The host computer 200 comprises a processor 210 (e.g., a microprocessor) communicatively coupled to the light detector 140, a computer readable medium (CRM) 210, and a display 230. The processor 200 receives signals with light data from the light detector 140. The processor 210 executes code stored on the CRM 210 to generate images or otherwise analyze the object 150 using the light data. The images and other output can be shown on the display 230. Any suitable images can be generated such as photoluminescence images, intensity images, phase images, differential interference contrast (DIC) images, etc. A photoluminescence image can refer to a fluorescence image or a phosphorescence image.

The illumination source 110 may be a component of the HIID 100 or may be separate from the HIID 100. The illumination source 110 may be provided by any suitable device(s). Some suitable devices include light-emitting diodes (LED), laser of suitable wavelength, broadband source (e.g., mercury lamp, halogen lamp, etc.) with a suitable filter, etc. Suitable illumination sources are commercially available. The illumination source 110 may be placed in any suitable location to generate the appropriate wavefront at the holographic element 120. The illumination source 110 may provide an illumination beam of any suitable wavelength, intensity, phase, polarization, spin angular momentum or other light property, and any suitable spatial distribution. In exemplary embodiments, the illumination source 110 provides an illumination beam with the same wavelength, same spatial distribution and/or other light properties, but not necessarily the same intensity, as the reference beam used to record the holographic element 120. In exemplary fluorescence/phosphorescence embodiments, the illumination source 110 provides excitation light having a first light property (e.g., first wavelength) matching the excitation wavelength of the fluorophores in an object 150 being imaged. The fluorophores are excited by the excitation light and emit light (emissions) of a second light property (e.g., second wavelength). Some examples of suitable excitation light include fluorescence, 2-photon or higher order fluorescence, Raman, second harmonic or higher order, or other emission mechanism that results in emissions at a different wavelength or other different light property than the excitation light.

Figure 2A:
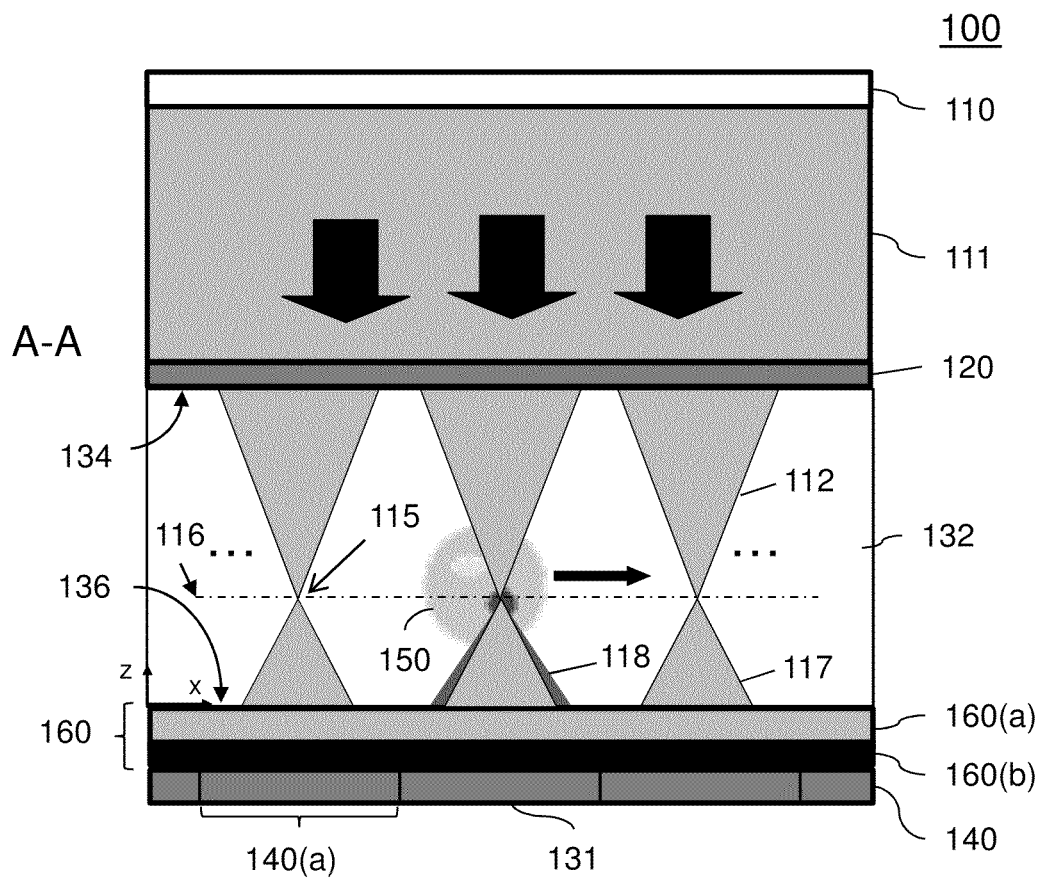
FIG. 2(a) is a schematic drawing of a cross sectional view of components of an HIID employing a microfluidic flow, according to embodiments of the invention.
Figure 2B:
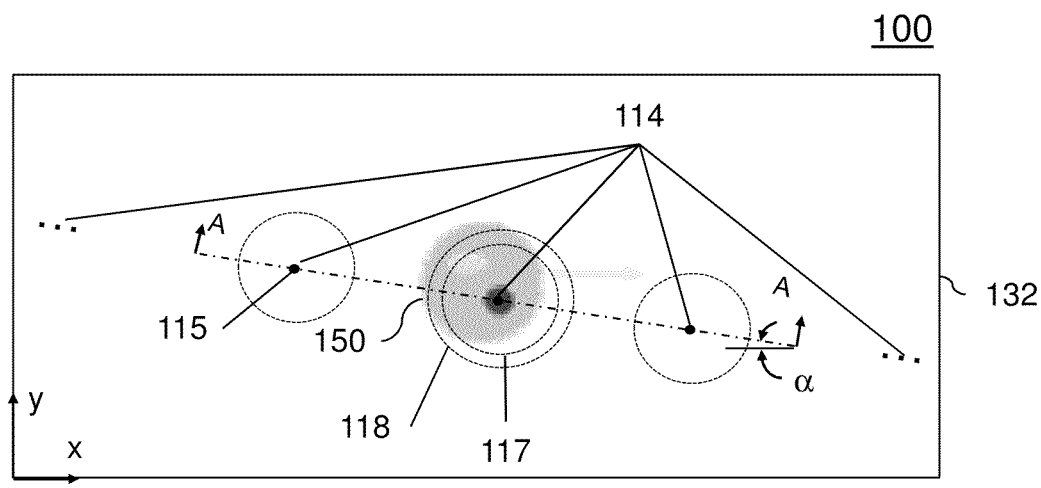
FIG. 2(b) is a schematic drawing of a partial top view of components of the HIID of FIG. 2(a), according to embodiments of the invention.

As used herein, a holographic element 120 refers to a suitable holographic film/plate/crystal capable of converting an illumination beam 111 (shown in FIG. 2(a)) from an illumination source 110 into a focal array of light spots 114 (shown in FIG. 2(b)). In many illustrated embodiments, the holographic element 120 transforms a wavefront of the illumination beam 111 from the illumination source 110 into an array of spherical wavefront to form a focal array of light spots 114. In other embodiments, the holographic element 120 may also transform a wavefront, planar or otherwise, from the illumination source 110 into an approximately spherical wavefront or other wavefront having a well separated structure. The holographic element 120 can be made of any suitable materials. Some examples of suitable holographic materials include photographic emulsions, dichromated gelatin, and photoresists. The holographic element 120 can have any suitable dimensions (e.g., 1 mm×1 mm, 2 mm×2 mm, 5 mm×2 mm, 10 mm×10 mm, 10 mm×50 mm, etc.). The holographic element 120 can be made using any holographic recording technique capable of encoding (recording) data about the focal array of light spots. Some examples of suitable holographic recording techniques include in-line (Gabor) and off-axis (Leith-Upatnieks). To play back the recording, the holographic element 120 can be illuminated by an illumination beam having the same wavelength, same spatial distribution, but not necessarily the same intensity, as the reference beam used to record the holographic element 120. Use of a holographic element 120 can allow for effective channeling of light power from the illumination source 110 into the light spots 115.

Figure 6:
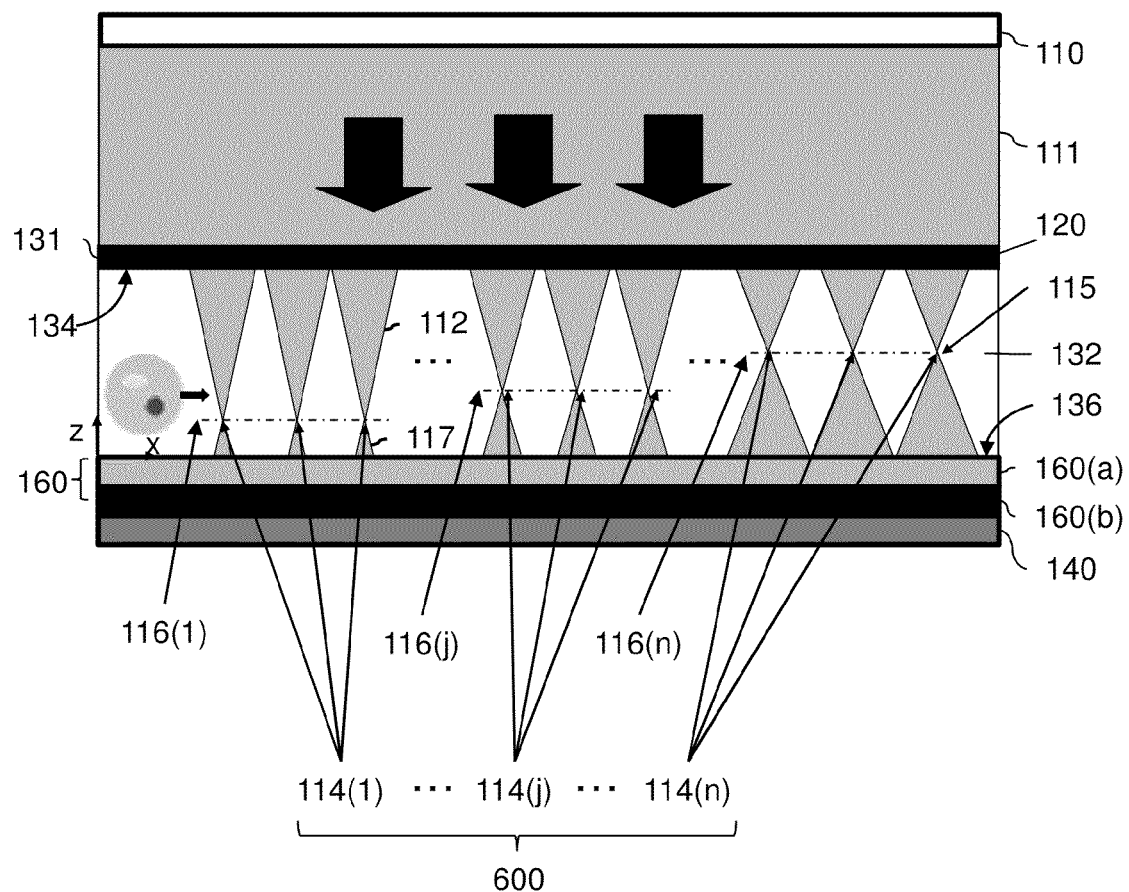
FIG. 6 is a schematic drawing of components of an HIID having multiple focal arrays in series at different depths for sectional imaging or three-dimensional imaging, according to embodiments of the invention.

The focal array of light spots 114 (shown in FIG. 2(b)) can have any suitable number of light spots (e.g., 1, 10, 100, 200, etc.) and can be any suitable array or combination of arrays. Some examples of suitable arrays include a one-dimensional array, a two-dimensional array, a three-dimensional array, and a multiplicity of one-dimensional, two-dimensional, and/or three-dimensional arrays. The arrays can have any suitable orientation or combination of orientations. In some embodiments, a three-dimensional array can be used to image at different depth positions of the specimen having the object 150 being imaged. For example, FIG. 6 is an illustration of an embodiment of an HIID 100 having a holographic element 120 generating a three-dimensional focal array of light spots 600 along the longitudinal axis of the fluid channel 132 and at different focal planes through the depth of the fluid channel 132. In FIG. 6, the three-dimensional array 600 is comprised of a plurality of n one-dimensional focal arrays of light spots 114(1)-114(n) at n different focal planes 116(1)-116(n) at different depths of the fluid channel 132. As an object 150 moves through the fluid channel 132, the light spots illuminate the object 150 at different focal planes and the object 150 alters the light. The light data can be used to generate sectional images of the object 150 at different depths and/or generate three-dimensional images of the object 150.

Each light spot 115 can be of any suitable size. Some examples of suitable diameters (FWHM) are 0.4 microns, 0.6 microns, 0.8 microns, 1 micron, etc. In one exemplary embodiment, the light spot diameter is 0.6 microns (FWHM). Any suitable spacing (5 microns, 10 microns, 15 microns, etc.) can be used between the light spots 115. In one exemplary embodiment, a light spot spacing of 20 microns is used.

In some embodiments, the holographic element 120 can be replaced by a diffractive optical element (DOE) in the HIID 100. A DOE refers to any suitable structure capable of diffracting light to generate a desired light pattern such as a focal array of light spots. Some examples of suitable DOEs include a Fresnel Zone plate, diffraction grating, photon sieve, etc. The DOE can be made of any suitable material and may have any suitable dimensions (e.g., 1 mm×1 mm, 2 mm×2 mm, 5 mm×2 mm, 10 mm×10 mm, 10 mm×50 mm, etc.). In some cases, using DOEs may be advantageous because they have a comparatively high shelf life. DOEs are also suitable for nanofabrication and semiconductor fabrication technique.

As used herein, the scanning mechanism 130 refers to a suitable device(s) capable of moving the object 150 being imaged relative to the light spots or the light spots relative the object 150 to substantially illuminate the object 150. The scanning mechanism 130 can be based on any suitable method including, for example, microfluidic flow methods, optical tweezing methods, and scanning methods (raster scanning, linear scanning, etc.). An example of a scanning mechanism 130 employing a microfluidic flow method includes a fluid channel 132 having a fluid flow with the object 150 being imaged. In another example, the scanning mechanism 130 may include a raster scanning device for raster scanning the object 150 or specimen stage with the object 150 through the light spots or raster scanning the light spots over the object 150. The scanning mechanism 130 can be in any suitable location that does not block the light from the illumination source 110.

A light detector 140 (e.g., a photosensor) refers to any suitable device capable of detecting light and generating signals with light data. The signals may be in the form of electrical current that results from the photoelectric effect. The light detector can be a single detector, a one-dimensional detector array, or a two-dimensional detector array. Some examples of single detectors include a photo-diode (PD), an avalanche photo-diode (APD) and a photomultiplier tubes (PMT). Some examples of one-dimensional or two-dimensional detector arrays include a charge coupled device (CCD) array, a complementary metal-oxide-semiconductor (CMOS) array, an APD array, a PD array, a PMT array, etc.

The light detector 140 includes one or more discrete light detecting elements 140(a) (shown in FIG. 2(a)) of any suitable size (e.g., 1-10 microns) and any suitable shape (e.g., circular or square). For example, a CMOS or CCD light detecting element 140(a) may be 1-10 microns and an APD or PMT light detecting element 140(a) may be as large as 1-4 mm. The light detecting elements 140(a) can be arranged in any suitable form such as a one-dimensional array, a two-dimensional array, or a multiplicity of one-dimensional and/or two-dimensional arrays. The arrays can be in any suitable orientation or combination of orientations. In some cases, the light detecting elements 140(a) can be arranged to correspond to the focal array of light spots 114 (shown in FIG. 2(b)). For example, the light detecting elements 140(a) can have the same form as the focal array of light spots 114 so that one or more light detecting elements 140(a) corresponds to a light spot.

The light detecting elements 140(a) can detect any suitable light data. Light data refers to any suitable information related to the light detected by the light detecting elements 140(a). Light data may include, for example, information about the properties of the light detected such as the intensity of the light, the wavelength(s) of the light, the frequency or frequencies of the light, the polarization(s) of the light, the phase(s) of the light, the spin angular momentum(s) of the light, and/or other light properties associated with the light detected by the light detecting elements 140(a). Light data may also include the location of the light detecting element 140(a) associated with the light data and the time that the light was detected by the light detecting element 140(a). The light data may be data based on a single time, based on multiple times, or on a time varying basis. In some embodiments such as the microfluidic flow embodiments, the light data may be time varying data.

The system 10 also includes a host computer 200 communicatively coupled to the light detector 140. The host computer 200 comprises a processor 210 (e.g., a microprocessor) coupled to a computer readable medium (CRM) 210 and a display 230. Alternatively, one or more components of the host computer 200 can be part of the HIID 100.

The processor 210 receives signals with light data from the light detector 140 associated with the light received by the light detecting elements 140(a). The processor 210 executes code stored on the CRM 220 to perform some of the functions of system 10 such as interpreting the light data from the light detector 142, performing analyses from the light data and/or generating images from the light data.

The CRM 220 (e.g., memory) stores code for performing some functions of system 10. The code is executable by the processor 210. In one embodiment, the CRM 220 comprises: a) code for interpreting the light data received from the light detector 142, b) code for performing analyses based on the light data, c) code for generating one or more images from the light data, d) code for displaying one or more images, and e) any other code for performing the functions of system 10.

The display 230 is communicatively coupled to the processor 210 to receive output data such as image data. Any suitable display may be used. In one embodiment, the display 230 may be part of the HIID 100. The display 230 may provide output such as images to a user of the HIID 100.

Modifications, additions, or omissions may be made to HIID system 10 without departing from the scope of the disclosure. For example, other embodiments of the HIID system 10 may not include a display 230. In addition, the components of system 10 may be integrated or separated according to particular needs. For example, the processor 210 may be integrated into the light detector 140 so that the light detector 140 performs all the functions of the processor 210 in some embodiments.

II. HIID Configurations

Several configurations of HIIDs 100 are described below. The first configuration includes an HIID 100 using a microfluidic flow method as a scanning mechanism 130. The second configuration adds a collection component 170 for collecting light for detection by the light detector 140. The third configuration is a reflective design including a beam splitter. The fourth configuration uses a three-dimensional focal array of light spots to sectionally image the object 150 at different depths. Although the illustrated embodiments of these configurations use microfluidic flow, other scanning mechanisms 130 can be used in these configurations.

A. Configuration 1

FIG. 2(a) is a schematic drawing of cross sectional view of components of an HIID 100 employing a microfluidic flow method, according to embodiments of the invention. FIG. 2(b) is a drawing of a partial top view of components of the HIID 100 shown in FIG. 2(a) taken at the focal plane 116, according to embodiments of the invention. The drawing in FIG. 2(a) is a cross-section A-A of the HIID 100 in FIG. 2(b) through a focal array of light spots 114.

In FIGS. 2(a) and 2(b), the HIID 100 includes a multi-layered body 131 with a holographic element 120 and an illumination source 110 providing an illumination beam 111 at the holographic element 120. The multi-layered body 131 also defines or includes a fluid channel 132 having a fluid flow with the object 150 being imaged. The fluid channel 132 has a first surface 134 and a second surface 136 on opposite sides of the fluid channel 132. The body 131 also includes an optional differentiating element 160 located outside the second surface 136 of the fluid channel 132 and a light detector 140 located outside the differentiating element 160.

In the illustrated embodiment, the holographic element 120 transforms the planar wavefront of the illumination beam 111 from the illumination source 110 into an array of converging spherical wavefront. In other embodiments, the holographic element 120 may also transform a wavefront, planar or otherwise, from the illumination source 110 into an approximately spherical wavefront or other wavefront having a well separated structure. In the illustrated embodiment, each volume is hour-glass shaped, forming a focal cone 112 converging to a light spot 115 at the focal plane 116 and spreading to a spreading volume 117. The array of spherical wavefront forms the focal array of light spots 114. The focal array of light spots 114 includes light spots 115 collectively extending across the fluid channel 132 or across a portion of the fluid channel 132. An object 150 moving through the fluid channel 132 can alter (e.g., block, reduce intensity, change wavelength, or otherwise modify a light property) the light. The altered light spreads into an altered light volume 118. The differentiating element 160 transmits light altered by the object 150. The light detector 140 receives light and generates time varying light data based on the received light as the object 150 moves through the fluid channel 132. A processor 210 (shown in FIG. 1) can use the time varying light data to generate images or otherwise analyze the object 150.

The HIID 100 also includes an x-axis, a y-axis, and a z-axis. The x-axis and a y-axis lie in the plane of the second surface 136 of the fluid channel 132. The x-axis lies along a longitudinal axis of the fluid channel 132. The z-axis is orthogonal to the x-axis and the y-axis.

In the illustrated example, the body 131 is a multi-layered structure. In other embodiments, the body 131 may be a single, monolithic structure. The layers of the body 131 may include any suitable material or combination of materials having any suitable thickness. The layers of the body 131 may also include any suitable devices (e.g., holographic element 120, light detector 140). Although FIGS. 2(a) and 2(b) have certain layers, other embodiments of the invention may integrate, omit, or add one or more layers or change the location of one or more layers in the body 131. For example, the body 131 may also include a collection component 170 (shown in FIG. 3) between the fluid channel 132 and the differentiating element 160 or between the differentiating element 160 and the light detector 140 in some embodiments. As another example, the body 131 may also include a layer (e.g., a protective layer) made of opaque, semi-opaque, or transparent material that lies between the second surface 136 of the fluid channel 132 and the layer with the differentiating element 160 or outside the first surface 134.

The fluid channel 132 may have any suitable dimensions. For example, the height of the fluid channel 132 can range from 1-20 microns and the width can range from 10-500 microns in some cases. In one embodiment, the fluid channel 132 may be sized based on the size of the objects 150 being imaged by the HIID 100. For example, the height of the fluid channel may be sized to be about the diameter of the object 150.

In microfluidic flow embodiments, the fluid flow in the fluid channel 132 is generally in the direction of the x-axis along a longitudinal axis of the fluid channel 132. Any suitable technique may be used for providing fluid flow and particulate transport of the objects 100 in the fluid channel 132 of these embodiments. Some convention techniques include pressure drive flow, electrokinetic transport, discrete droplet translocation via electrowetting, or thermocapilarity techniques. Other techniques may include gravity drive flow, hydrodynamic focusing, dielectrophoresis, and optical tweezing. Any suitable control device(s) may be used to control the flow of fluid and/or movement of the object 150 through the fluid channel 132. Some examples of suitable control devices include micropumps, direct current (DC) electrokinetic devices, dielectrophoresis electrodes, and/or hydrodynamic focusing channels.

The illumination source 110 may be a component of the HIID 100 or may be separate from the HIID 100. The illumination source 110 may be provided by any suitable device(s). Some suitable devices include light-emitting diodes (LED), laser of suitable wavelength, broadband source (e.g., mercury lamp, halogen lamp, etc.) with a suitable filter, etc. Suitable illumination sources are commercially available. The illumination source 110 may be placed in any suitable location to generate the appropriate wavefront at the holographic element 120. In the illustrated embodiment, the illumination source 110 provides an illumination beam 111 with the same wavelength, same spatial distribution and/or other light properties, but not necessarily the same intensity, as the reference beam used to record the holographic element 120. In exemplary fluorescence and phosphorescence embodiments, the illumination source 110 provides excitation light having a first light property (e.g., first wavelength) matching the excitation wavelength of the fluorophores in an object 150 being imaged. The fluorophores are excited by the excitation light and emit light (emissions) of a second light property (e.g., second wavelength). Some examples of suitable excitation light include fluorescence, 2-photon or higher order fluorescence, Raman, second harmonic or higher order, or other emission mechanism that results in emissions at a different wavelength or other different light property than the excitation light.

The holographic element 120 transforms the planar wavefront of the illumination beam 111 from the illumination source 110 into an array of converging spherical wavefront to form a focal array of light spots 114 at the focal plane 116. In other embodiments, the holographic element 120 may also transform a wavefront, planar or otherwise, from the illumination source 110 into an approximately spherical wavefront or other wavefront having a well separated structure. The holographic element 120 can be made of any suitable materials. The holographic element 120 can have any suitable dimensions (e.g., 1 mm×1 mm, 2 mm×2 mm, 5 mm×2 mm, 10 mm×10 mm, 10 mm×50 mm, etc.). The holographic element 120 can be made using any holographic recording technique capable of encoding (recording) data about the focal array of light spots. To play back, the holographic element 120 can be illuminated by a beam having the same wavelength, same spatial distribution, but not necessarily the same intensity, as the reference beam used to record the holographic element 120.

In FIGS. 2(a) and 2(b), the focal array of light spots 114 includes a one-dimensional array of light spots 115 located at an angle, α with respect to the x-axis. The angle, α can be any suitable angle (e.g., 5 degrees, 10 degrees, ... 90 degrees, ... 170 degrees, etc.). In many cases, the light spots 115 collectively extend diagonally across the fluid channel 132. In other cases, the light spots 115 may collectively extend in a direction parallel to the y-axis and across the fluid channel 132. Any suitable number of light spots 115 can be used (e.g., 1, 10, 50, 100, 500, etc.). In some cases, the number of light spots 115 may be determined by the number of light spots 115 needed to collectively extend across a width of the fluid channel 132 where the objects 150 being examined flow. Although FIGS. 2(a) and 2(b) show the HIID 100 having a single one-dimensional focal array of light spots 114, other embodiments may have a two-dimensional array, a three-dimensional array, or a combination of one, two, and/or three-dimensional arrays.

Each light spot 115 can be of any suitable size. Some examples of suitable diameters (FWHM) are 0.4 microns, 0.6 microns, 0.8 microns, 1 micron, etc. In one exemplary embodiment, the light spot diameter is 0.6 microns (FWHM). Any suitable spacing (5 microns, 10 microns, 15 microns, etc.) can be used between the light spots 115. In one exemplary embodiment, a light spot spacing of 20 microns is used.

In the illustrated example, the scanning mechanism 130 employs a microfluidic flow method. The scanning mechanism 130 includes the fluid channel 132 defined by the body 131 and the fluid carrying the object 150 through the fluid channel 132. Although the illustrated embodiment includes a scanning mechanism 130 employing a microfluidic flow method, other methods (e.g., optical tweezing, scanning method, etc.) can be used in other embodiments. For example, one embodiment may have a scanning mechanism 130 that includes a scanning device (e.g., raster scanner, linear scanner, etc.) for scanning the object 150 or specimen stage with the object 150 through light spots 115 or scanning the light spots 115 across or through the object 150.

In the illustrated embodiment, the light detector 140 detects light and generates signals with time varying light data about the properties of the light detected. Some examples of light properties that can be detected include intensity, wavelength, frequency, polarization, phase, spin angular momentum, etc. The light detector can be a single detector, a one-dimensional detector array, or a two-dimensional detector array. Some examples of single detectors include a photodiode (PD), an avalanche photo-diode (APD) and a photomultiplier tubes (PMT). Some examples of one-dimensional or two-dimensional detector arrays include a charge coupled device (CCD) array, a complementary metal-oxide-semiconductor (CMOS) array, an APD array, a PD array, a PMT array, etc. The light detector 140 may be a monochromatic or a color detector. For example, the light detector 140 may be a color light detector that generates light data that can be used to generate color images.

The light detector 140 includes an array of discrete light detecting elements 140(a) of any suitable size (e.g., 1-10 microns) and any suitable shape (e.g., circular or square). The array of light detecting elements 140(a) may be a one-dimensional array or a two-dimensional array. The array or arrays can be in any suitable orientation or combination of orientations. In the illustrated example, the array is a two-dimensional array of light detecting elements 140(a) located at an angle, α with respect to the x-axis. Any suitable angle can be used. In the illustrated example, each light detecting element 140(a) detects light associated with a single light spot 115. In other cases, each light detecting element 140(a) may detect light from more than one light spot 115. Other embodiments may also have a plurality (e.g., 2×2 grid, 4×4 grid, etc.) of light detecting elements 140(a) from the two-dimensional array of light detecting elements 140(a) that detects light from a single light spot 115.

In FIGS. 2(a) and 2(b), the object 150 is shown at a time (t=t₁) as the object 150 moves through the fluid channel 132 generally in the x-direction. Although the object 150 is shown as a cell, other embodiments may include other suitable object(s). Some examples of suitable objects include biological and inorganic entities. Some examples of biological entities include whole cells, cell components, microorganisms such as bacteria or viruses, cell components such as proteins, etc. Any suitable number of objects 150 may be imaged and/or analyzed using the HIID 100.

The body 131 of the HIID 100 may optionally include a differentiating element 160 located outside the second surface 136. A differentiating element 160 refers to any suitable device(s) (e.g., optical filters) capable of selectively transmitting light having select light properties (e.g., polarization, wavelength, frequency, intensity, phase, spin angular momentum, etc.) while substantially removing light the remaining light by any suitable method such as reflection, absorption or interference. Some examples of suitable devices include filters (e.g., interference filters, absorption filters, etc.). Any type of filter can be used such as dichroic filters, monochromatic filters, etc. In one embodiment, a polarization filter may be used. In the illustrated embodiment, the differentiating element 160 includes an interference filter 160(a) and an absorption filter 160(b). The interference filter 160(a) transmits the altered light and removes remaining light from the illumination source 110 by interference. The absorption filter absorbs remaining light from the illumination source 110. In fluorescence and phosphorescence applications, the differentiating element 160 may be used to transmit emissions from fluorophores in the object 150 and substantially removes excitation light.

In an exemplary operation, the illumination source 110 provides an illumination beam 111 at the holographic element 120. The holographic element 120 transforms the planar wavefront of the illumination beam 111 from the illumination source 110 into an array of converging spherical wavefront. In other embodiments, the holographic element 120 may also transform a wavefront, planar or otherwise, from the illumination source 110 into an approximately spherical wavefront or other wavefront having a well separated structure.

In the exemplary operation, each volume is hour-glass shaped, forming a focal cone 112 converging to a light spot 115 at the focal plane 116 and spreading to a spreading volume 117. The array of spherical wavefront forms the focal array of light spots 114. The focal array of light spots 114 is formed at the focal plane 116 in the fluid channel 132.

During operation, a fluid, within which the object 150 is suspended, flows through the fluid channel 132. As the object 150 flows through the fluid channel 132, the object 150 alters (blocks, reduces intensity, modifies wavelength or other light property or spatial distribution) the light in the fluid channel 132. FIGS. 2(a) and 2(b) show the object 150 at a specific time (t=t₁) proximal a single light spot 115. At this time, light altered by the object 150 spreads from the site of the single light spot 115 in the form of an altered light volume 118. Although the illustration shows altered light only originating from the site of a light spots 115, altered light may also originate from other areas (e.g., focal cones 112 and spreading cones) in other embodiments.

The differentiating element 160 transmits the altered light (e.g., reduced intensity, altered wavelength, etc.) to the light detecting elements 140(a). Light that does not interact with the object 150 is at least partially removed by the differentiating element 160.

In the illustrated embodiment, each light detecting element 140(a) receives light associated a single corresponding light spot 115 in the focal array 114. In other embodiments, each light detecting element 140(a) may receive light associated with other light spots 115. The light detecting elements 140(a) receive light and generate time varying light data about the light as the object 150 moves through the fluid channel 132. The processor 210 receives a signal with time varying light data. The processor 210 uses the time varying light data to generate line scans associated with the y-locations of the light detecting elements 140(a). Each line scan is associated with a light spot 115. The time varying light data from the light detecting elements 140(a) is dependent on the profile of the object 150 as well as its optical properties. The processor 210 can reconstruct an image of the object 150 by appropriately shifting and assembling the line scans, and optionally other data such as rotation, velocity of the object 150, and changes in shape of the object 150, etc.

The HIID 100 can be used to generate any suitable type of image such as a fluorescence image, phosphorescence image, intensity images, phase image, differential interference contrast (DIC) image, etc. The images can be black and white images, grey tone images, color images, etc.

In one exemplary embodiment, the HIID 100 can be used in fluorescence or phosphorescence imaging (collectively, photoluminescence imaging). The specimen with one or more objects 150 may be prepared by mixing a reagent with the specimen. The reagent may be suitable chemical for attaching (tagging) portions (e.g., molecules of a cell nucleus) of the objects 150 with fluorophores. A fluorophore refers to a component of a molecule which causes the molecule to be fluorescent or phosphorescent. The resulting fluid is introduced into the fluid channel 132 of the HIID 100. The illumination source 110 provides an illumination beam 111 of excitation light having a first light property (e.g., first wavelength, first polarization, etc.) that can excite the fluorophores in the object 150. The holographic element 120 transforms the wavefront of the illumination source 110 of excitation light into an array of converging spherical wavefront, nearly spherical wavefront, or other wavefront having a well separated structure to form a focal array of light spots 114 of excitation light. The fluorophores absorb the excitation light and emit light (emissions) having a second light property (e.g., a second wavelength, a second polarization, etc.). The emissions spread from site of the light spot 115 in the form of an altered light volume 118. The differentiating element 160 transmits emissions and substantially removes remaining light. The light detector 140 detects light and generates time varying light data associated with the received light as the object 150 flows through the flow channel 132. The processor 210 receives a signal from the light detector 140 having time varying data and generates one or more fluorescence or phosphorescence images of the object 150 based on the time varying data.

In one embodiment, the holographic element 120 can be replaced by one or more diffractive optical elements (DOE) (e.g., a Freznel zone plate (FZP), diffraction grating, photon sieve, etc.) at the same location illuminated by the illumination beam 111. The DOE diffracts the illumination beam 111 to generate the focal cones 112 and focal array of light spots 114. The DOE can be made of any suitable material and may have any suitable dimensions (e.g., 1 mm×1 mm, 2 mm×2 mm, . . . , 10 mm×10 mm). Using DOEs may be advantageous because they have a high shelf life. DOEs are also suitable for nanofabrication and semiconductor fabrication technique.

B. Configuration 2—HIID 100 with Collection Component

Figure 3:
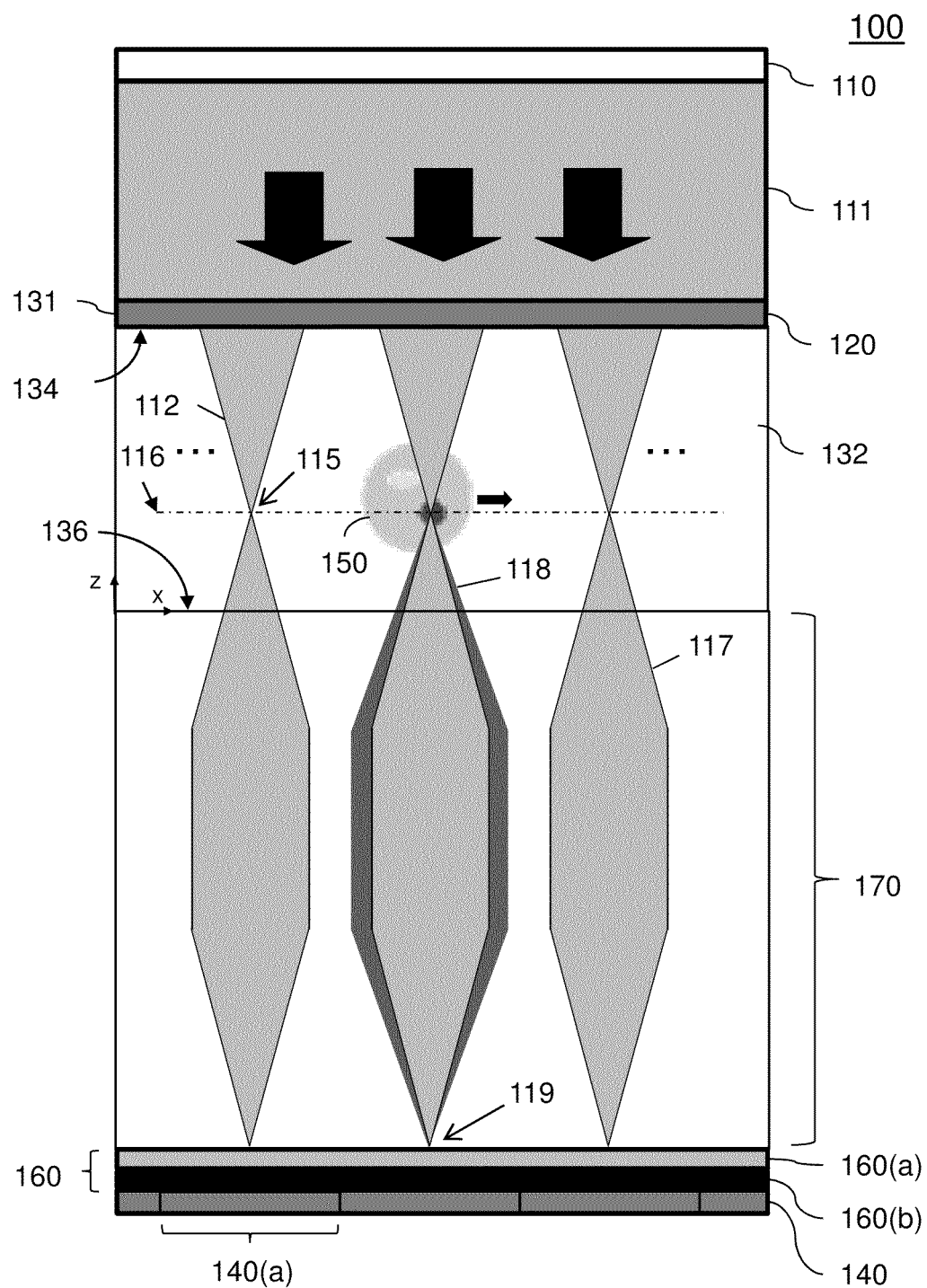
FIG. 3 is a schematic drawing of components of an HIID having a collection component, according to embodiments of the invention.

In some embodiments, the HIID 100 includes a collection component 170 for collecting light for detection by the light detector 140. FIG. 3 is a schematic drawing of components of an HIID 100 having a collection component 170, according to embodiments of the invention. The drawing in FIG. 3 is a cross sectional view of components HIID 100 at a line through a focal array of light spots 114. In FIG. 3, an illumination source 110 provides an illumination beam 111 to a holographic element 120.

In FIG. 3, the HIID 100 has a multi-layered body 131 including the holographic element 120. The multi-layered body 131 also defines or includes a fluid channel 132 having a fluid flow with an object 150 being imaged. The fluid channel 132 has a first surface 134 and a second surface 136 on opposite sides of the fluid channel 132. The body 131 also includes a collection component 170 outside the second surface 136 of the fluid channel 132, an optional differentiating element 160 located outside the collection component 170, and a light detector 140 located outside the differentiating element 160.

In the illustrated embodiment, the holographic element 120 transforms the planar wavefront of the illumination beam 111 from the illumination source 110 into an array of converging spherical wavefront. In other embodiments, the holographic element 120 may also transform a wavefront, planar or otherwise, from the illumination source 110 into an approximately spherical wavefront or other wavefront having a well separated structure. In the illustrated embodiment, each volume is hour-glass shaped, forming a focal cone 112 converging to a light spot 115 at the focal plane 116 and spreading to a spreading volume 117. The array of spherical wavefront forms the focal array of light spots 114. The focal array 114 includes light spots 115 that collectively extend across the fluid channel 132 or across a portion of the fluid channel 132. An object 150 moving through the fluid channel 132 can alter (e.g., block, reduce intensity, change wavelength, or otherwise modify a light property) light. The altered light spreads in an altered light volume 118. The collecting component 170 refocuses light transmitted through the second surface 136 into an array of collections spots 119 at an outside surface of the collection component 170. The differentiating element 160 transmits light altered by the object 150. The light detector 140 receives light and generates time varying light data based on the received light as the object 150 moves through the fluid channel 132. A processor 210 (shown in FIG. 1) can use the time varying light data to generate images or otherwise analyze the object 150. Using a collection component 170 can be advantageous in improving the quality of the light data collected at the light detector 140 which can improve the quality of the images and other analyses performed by the HIID 100. In fluorescence and phosphorescence applications, a collection component 170 can be advantageous to collect emissions that may be highly scattered and weak.

The HIID 100 also includes an x-axis and a z-axis. The x-axis lies along a longitudinal axis of the fluid channel 132. The z-axis is orthogonal to the x-axis.

In the illustrated embodiment, the body 131 is a multi-layer structure. The layers of the body 131 may include any suitable material or combination of materials having any suitable thickness. The layers of the body 131 may also include any suitable devices (e.g., holographic element 120, light detector 140). Other embodiments may integrate, omit, or add one or more layers or change the location of one or more layers in the body 131. For example, the collection component 170 may be omitted in some embodiments. As another example, the body 131 may also include a protective layer made of opaque, semi-opaque, or transparent material that lies between the second surface 136 of the fluid channel 132 and the layer with the differentiating element 160 or outside the first surface 134.

The fluid channel 132 may have any suitable dimensions. For example, the height of the fluid channel 132 can range from 1-20 microns and the width can range from 10-500 microns in some cases. In one embodiment, the fluid channel 132 may be sized based on the size of the objects 150 being imaged by the HIID 100. For example, the height of the fluid channel may be sized to be about the diameter of the object 150. The fluid flow in the fluid channel 132 is generally in the direction of the x-axis along a longitudinal axis of the fluid channel 132. Any suitable technique (e.g., pressure drive flow, electrokinetic transport, discrete droplet translocation via electrowetting, thermocapilarity techniques, gravity drive flow, hydrodynamic focusing, dielectrocphoresis, optical tweezing, etc.) may be used for providing fluid flow and particulate transport of the objects 100 in the fluid channel 132. Any suitable control device(s) (e.g., micropumps, direct current (DC) electrokinetic devices, dielectrophoresis electrodes, hydrodynamic focusing channels, etc.) may be used to control the flow of fluid and/or movement of the object 150 through the fluid channel 132.

The illumination source 110 may be a component of the HIID 100 or may be separate from the HIID 100. The illumination source 110 may be provided by any suitable device(s). Some suitable devices include light-emitting diodes (LED), laser of suitable wavelength, broadband source (e.g., mercury lamp, halogen lamp, etc.) with a suitable filter, etc. Suitable illumination sources are commercially available. The illumination source 110 may be placed in any suitable location to generate the appropriate wavefront at the holographic element 120. In the illustrated embodiment, the illumination source 110 provides an illumination beam 111 with the same wavelength, same spatial distribution and/or other light properties, but not necessarily the same intensity, as the reference beam used to record the holographic element 120. In exemplary fluorescence and phosphorescence embodiments, the illumination source 110 provides excitation light having a first light property (e.g., first wavelength) matching the excitation wavelength of the fluorophores in an object 150 being imaged. The fluorophores are excited by the excitation light and emit light (emissions) of a second light property (e.g., second wavelength). Some examples of suitable excitation light include fluorescence, 2-photon or higher order fluorescence, Raman, second harmonic or higher order, or other emission mechanism that results in emissions at a different wavelength or other different light property than the excitation light.

In the illustrated embodiment, the holographic element 120 transforms the planar wavefront of the illumination beam 111 from the illumination source 110 to an array of converging spherical wavefront to form a focal array of light spots 114 at the focal plane 116. In other embodiments, the holographic element 120 may also transform a wavefront, planar or otherwise, from the illumination source 110 into an approximately spherical wavefront or other wavefront having a well separated structure. The holographic element 120 can be made of any suitable materials and have any suitable dimensions (e.g., 1 mm×1 mm, 2 mm×2 mm, ..., 10 mm×10 mm, etc.). The holographic element 120 can be made using any holographic recording technique capable of encoding (recording) data about the focal array of light spots. To play back, the holographic element 120 can be illuminated by a beam having the same wavelength, same spatial distribution, but not necessarily the same intensity, as the reference beam used to record the holographic element 120.

In FIG. 3, the focal array of light spots 114 includes a one-dimensional array of light spots 115 located at an angle, $\alpha$ (shown in FIG. 2($b$)) with respect to the x-axis. The angle, $\alpha$ can be any suitable angle (e.g., 5 degrees, 10 degrees, ... 90 degrees, ... 170 degrees, etc.). Any suitable number of light spots 115 can be used (e.g., 1, 10, 50, 100, 500, etc.). Although FIG. 3 has a single one-dimensional focal array of light spots 114, other embodiments may have a two-dimensional array, a three-dimensional array, or a combination of one, two, and/or three-dimensional arrays.

Each light spot 115 can be of any suitable size. Some examples of suitable diameters (FWHM) are 0.4 microns, 0.6 microns, 0.8 microns, 1 micron, etc. In one exemplary embodiment, the light spot diameter is 0.6 microns (FWHM). Any suitable spacing (5 microns, 10 microns, 15 microns, etc.) can be used between the light spots 115. In one exemplary embodiment, a light spot spacing of 20 microns is used.

In the illustrated example, the scanning mechanism 130 employs a microfluidic flow method. The scanning mechanism 130 includes the fluid channel 132 defined by the body 131 and the fluid carrying the object 150 through the fluid channel 132. Although the illustrated embodiment includes a scanning mechanism 130 employing a microfluidic flow method, other methods (e.g., optical tweezing, scanning method, etc.) can be used in other embodiments. For example, one embodiment may have a scanning mechanism 130 that includes a scanning device (e.g., raster scanner, linear scanner, etc.) for scanning the object 150 or specimen stage with the object 150 through light spots 115 or scanning the light spots 115 across or through the object 150.

In the illustrated embodiment, the light detector 140 detects light and generates signals with time varying light data about the properties of the light detected. Some examples of light properties that can be detected include intensity, wavelength, frequency, polarization, phase, spin angular momentum, etc. The light detector 140 can be a single detector, a one-dimensional detector array, or a two-dimensional detector array of light detecting elements 140($a$). Some examples of single detectors include a photo-diode (PD), an avalanche photo-diode (APD) and a photomultiplier tubes (PMT). Some examples of one-dimensional or two-dimensional detector arrays include a charge coupled device (CCD) array, a complementary metal-oxide-semiconductor (CMOS) array, an APD array, a PD array, a PMT array, etc. The light detector 140 may be a monochromatic or a color detector. For example, the light detector 140 may be a color light detector that generates light data that can be used to generate color images.

The light detector 140 includes an array of discrete light detecting elements 140($a$) of any suitable size (e.g., 1-10 microns) and any suitable shape (e.g., circular or square). The array of light detecting elements 140($a$) may be a one-dimensional array or a two-dimensional array. The array or arrays can be in any suitable orientation or combination of orientations. In the illustrated example, the array is a two-dimensional array of light detecting elements 140($a$) located at an angle, $\alpha$ with respect to the x-axis. Any suitable angle can be used. In the illustrated example, each light detecting element 140($a$) detects light associated with a single light spot 115. In other cases, each light detecting element 140($a$) may detect light from more than one light spot 115. Other embodiments may also have a plurality (e.g., 2×2 grid, 4×4 grid, etc.) of light detecting elements 140($a$) from the two-dimensional array of light detecting elements 140($a$) that detects light from a single light spot 115.

In FIG. 3, the object 150 is shown at a time ($t=t_1$) as the object 150 moves through the fluid channel 132 generally in the x-direction. Although the object 150 is shown as a cell, other embodiments may include other suitable object(s) (e.g. biological and inorganic entities). Any suitable number of objects 150 may be imaged and/or analyzed using the HIID 100.

The body 131 of the HIID 100 may optionally include a differentiating element 160 located outside the second surface 136. The differentiating element 160 selectively transmits altered light while substantially removing the remaining light. The differentiating element 160 includes an interference filter 160($a$) and an absorption filter 160($b$). The interference filter 160($a$) transmits the altered light and removes remaining light from the illumination source 110 by interference. The absorption filter absorbs remaining light from the illumination source 110. In fluorescence and phosphorescence applications, a differentiating element 160 may be used to transmit emissions from fluorophores in the object 150 and substantially remove excitation light.

The collection component 170 refers to a device(s) capable of refocusing light passing through the second surface 136 and associated with each light spot 115 to one or more light detecting elements 140($a$). By refocusing the altered light, the detection efficiency may be increased. The collection component 170 can include any suitable device or combination of suitable devices. Some examples of suitable devices include a refractive lens or other diffractive elements (e.g., Fresnel zone plate).

The collection component 170 can refocus light into any suitable light distribution at any suitable plane(s). In some embodiments, the light distribution may be a tightly confined collection spot 119. In other embodiments, the light distribution may be a wider distribution that can be detected by one or more light detecting elements 140($a$). The collection component 170 may be in any suitable location. For example, the collection component 170 may be located between the differentiating element 160 and the light detector 140 of the HIID 100 shown in FIG. 2(a). As another example, the collection component 170 can be located between the second surface 136 of the fluid channel 132 and the differentiating element 160 as shown in FIG. 3.

In FIG. 3, the collection component 170 refocuses light associated with each light spot 115 into an array of collection spots 119 at the outside surface of the collection component 170. Light transmitted through the second surface 136 continues spreading until the mid portion of the collection component 170. At the mid portion, the light no longer spreads and focuses to an array of collection spots 119 on the outer surface of the collection component 170. Any suitable device or devices (e.g., refractive lenses) may be used to provide for this collection.

Figure 4:
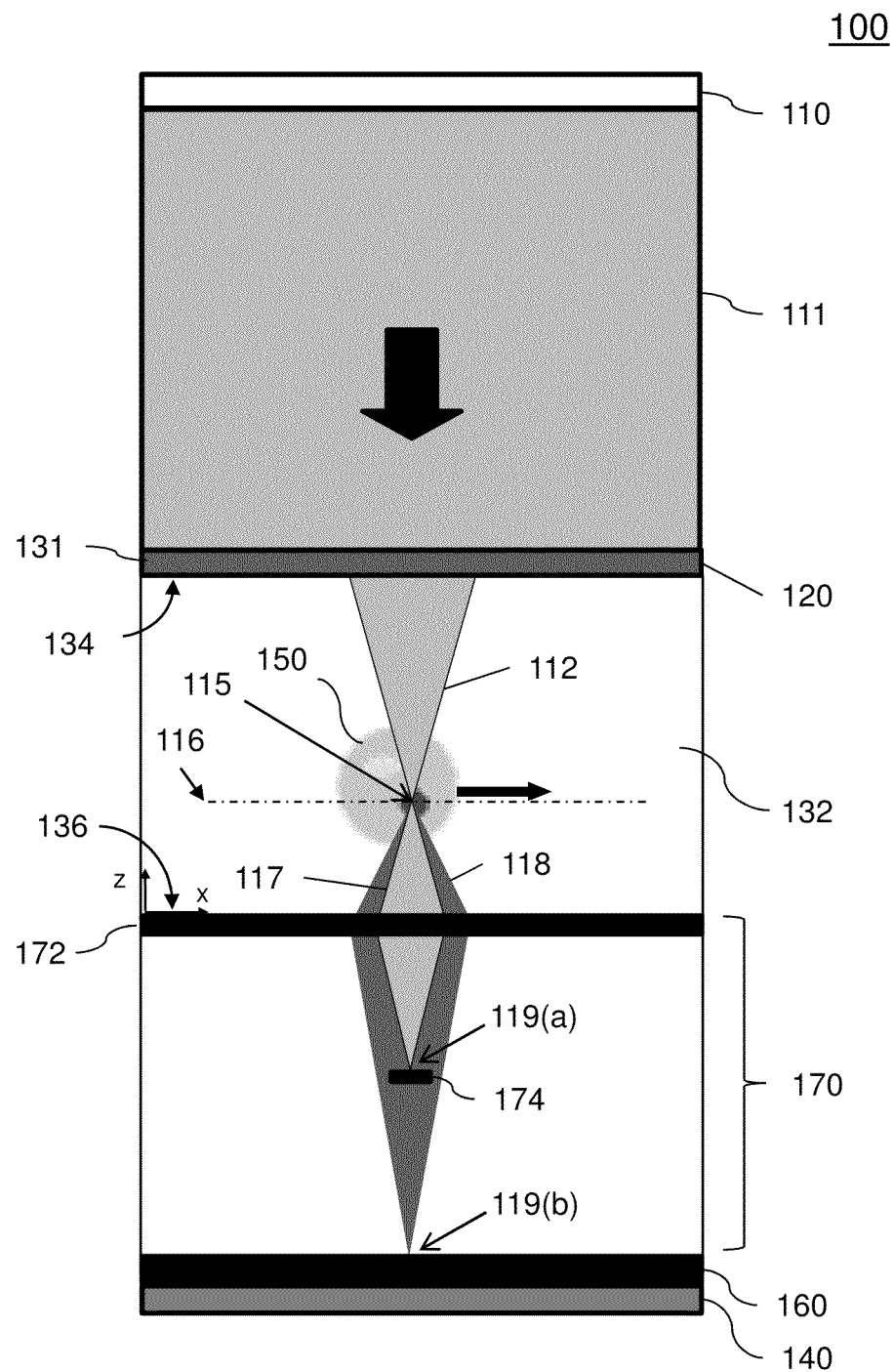
FIG. 4 is a schematic drawing of components of an HIID having a collection component including a diffraction optical element (DOE) and a beam block, according to embodiments of the invention.

FIG. 4 is a schematic drawing of components of an HIID 100 having a collection component 170 including a DOE (e.g., Fresnel zone plate, diffraction grating, photon sieve, etc.) 172 and a beam block 174, according to embodiments of the invention. The drawing is a cross sectional view through a portion of the HIID 100 having a light spot 115 of the focal array of light spots 114. The diffractive element 172 refers to a device capable of modifying light passing through the second surface 136 into collection spots 119(a) and 119(b). A beam block 174 can refer to a suitable device capable of blocking all light. In an exemplary fluorescence or phosphorescence operation, a beam block 174 can be designed to remove the unscattered excitation light.

In FIG. 4, the HIID 100 includes a multi-layered body 131 and an illumination source 110 providing an illumination beam 111. The body 131 includes a holographic element 120 and defines or includes a fluid channel 132 having a fluid flow with an object 150 being imaged. The fluid channel 132 has a first surface 134 and an opposing second surface 136. The body 131 also includes the collection component 170 having a DOE 172 and beam block 174, an optional differentiating element 160, a light detector 140, an x-axis, and a z-axis. By using a beam block 174, the differentiating element 160 in the HIID 100 can be less powerful and potentially smaller so that the HIID 100 having a beam block 174 can be more compact. In these embodiments, the addition of a collection component 170 with a beam block 174 can allow for a more compact HIID 100 and a more compact system 10.

In FIG. 4, the collection component 170 refocuses the light passing through the second surface 136. The DOE 172 or holographic elements or a refractive lens focuses the unscattered light (e.g., excitation light) passing through the second surface 136 from the spreading volume 117 to a plane where the beam block 174 is located. The beam block 174 blocks the light focused at the beam block 174. The DOE 172 focuses the light altered by the object 150 (e.g., emissions) that pass through the second surface 136 from altered light volume 118 into a second collection spot 119(b) at the detector plane at the outer surface of the collection component 170.

In an exemplary operation of an HIID 100 with a collection component 170, the illumination source 110 provides the illumination beam 111. The holographic element 120 transforms the wavefront, planar or otherwise, of the illumination source 110 into an array of spherical wavefront, nearly spherical wavefront, or other wavefront having a well separated structure to form a focal array of light spots 114 at the focal plane 116 in the fluid channel 132. The light spreads in the form of spreading volumes 117.

As fluid flows through the fluid channel 132, the object 150 alters light in the fluid channel 132. FIG. 3 shows the object 150 at a specific time ($t=t_1$). The altered light spreads from each site of the light spot 115 in the form of an altered light volume 118. Although the illustration shows altered light only originating from the site of the light spots 115, altered light may also originate from other areas (e.g., focal cones 112) in other embodiments. The collection component 170 refocuses light passing through the second surface 136 into an array of collection spots 119. In some cases, the collection component may have devices such as a beam block 174 that block light that did not interact with the object 150. The differentiating element 160 removes any light that did not interact with the object 150 and that transmits through the outer surface of the collection component 170. The differentiating element 160 transmits light altered by the object 150 to the light detecting elements 140(a).

In this exemplary operation, each light detecting element 140(a) receives light associated with a single corresponding light spot 115 in the focal array 114. In other embodiments, each light detecting element 140(a) may receive light associated with other light spots 115. The light detecting elements 140(a) receive light and generate time varying light data about the light as the object 150 moves through the fluid channel 132. The processor 210 receives a signal with time varying light data and uses the time varying light data to generate line scans associated with the y-locations of the light detecting elements 140(a). Each line scan is associated with a light spot 115. The time varying light data from the light detecting elements 140(a) is dependent on the profile of the object 150 as well as its optical properties. The processor 210 can reconstruct an image of the object 150 by appropriately shifting and assembling the line scans, and optionally other data such as rotation, velocity of the object 150, and changes in shape of the object 150, etc.

The HIID 100 including a collection component 170 can be used to generate any suitable type of image such as a fluorescence image, phosphorescence image, intensity images, phase image, differential interference contrast (DIC) image, etc. For example, the HIID 100 with a collection component 170 can be used in fluorescence or phosphorescence imaging. In this example, the illumination source 110 provides an illumination beam 111 of excitation light having a first light property that can excite fluorophores in the object 150. In the illustrated embodiment, the holographic element 120 transforms the planar wavefront of the illumination beam 111 of excitation light into an array of converging spherical wavefront. In other embodiments, the holographic element 120 may also transform a wavefront, planar or otherwise, from the illumination source 110 into an approximately spherical wavefront or other wavefront having a well separated structure. In the illustrated embodiment, the spherical wavefront are in the form of focal cones 112 converging to a focal array of light spots 114 of excitation light. The fluorophores absorb the excitation light and emit light (emissions) having a second light property. The emissions spread from site of the light spot 115 in the form of an altered light volume 118. The collection component 170 refocuses light passing through the second surface 136 into an array of collection spots 119. The differentiating element 160 transmits emissions and substantially removes remaining light. The light detector 140 detects light and generates time varying light data associated with the received light as the object 150 flows through the flow channel 132. The processor 210 receives a signal from the light detector 140 having time varying data and generates one or more fluorescence or phosphorescence images of the object 150 based on the time varying data.

In one embodiment, the holographic element 120 can be replaced by one or more diffractive optical elements (DOE)

(e.g., a Freznel zone plate (FZP), diffraction grating, photon sieve, etc.) at the same location illuminated by the illumination beam 111. The DOE diffracts the illumination beam 111 to generate the focal cones 112 and focal array of light spots 114. The DOE can be made of any suitable material and may have any suitable dimensions (e.g., 1 mm×1 mm, 2 mm×2 mm, . . . , 10 mm×10 mm). Using DOEs may be advantageous because they have a high shelf life. DOEs are also suitable for nanofabrication and semiconductor fabrication technique.

C. Configuration 3—Reflective Design with Beam Splitter

In some embodiments, the HIID 100 has a reflective design configuration with a beam splitter 190. A beam splitter 190 refers to an optical device capable of splitting a single beam of light of a particular type into two or more beams of light of different types (e.g., different wavelengths, different polarizations, etc.). In a fluorescence or phosphorescence application, the beam splitter 190 can be designed to reflect excitation light and transmit emitted light (emissions) from fluorophores. The beam splitter 190 can be in any suitable form (e.g., cube, half-silvered mirror, etc.).

Figure 5:
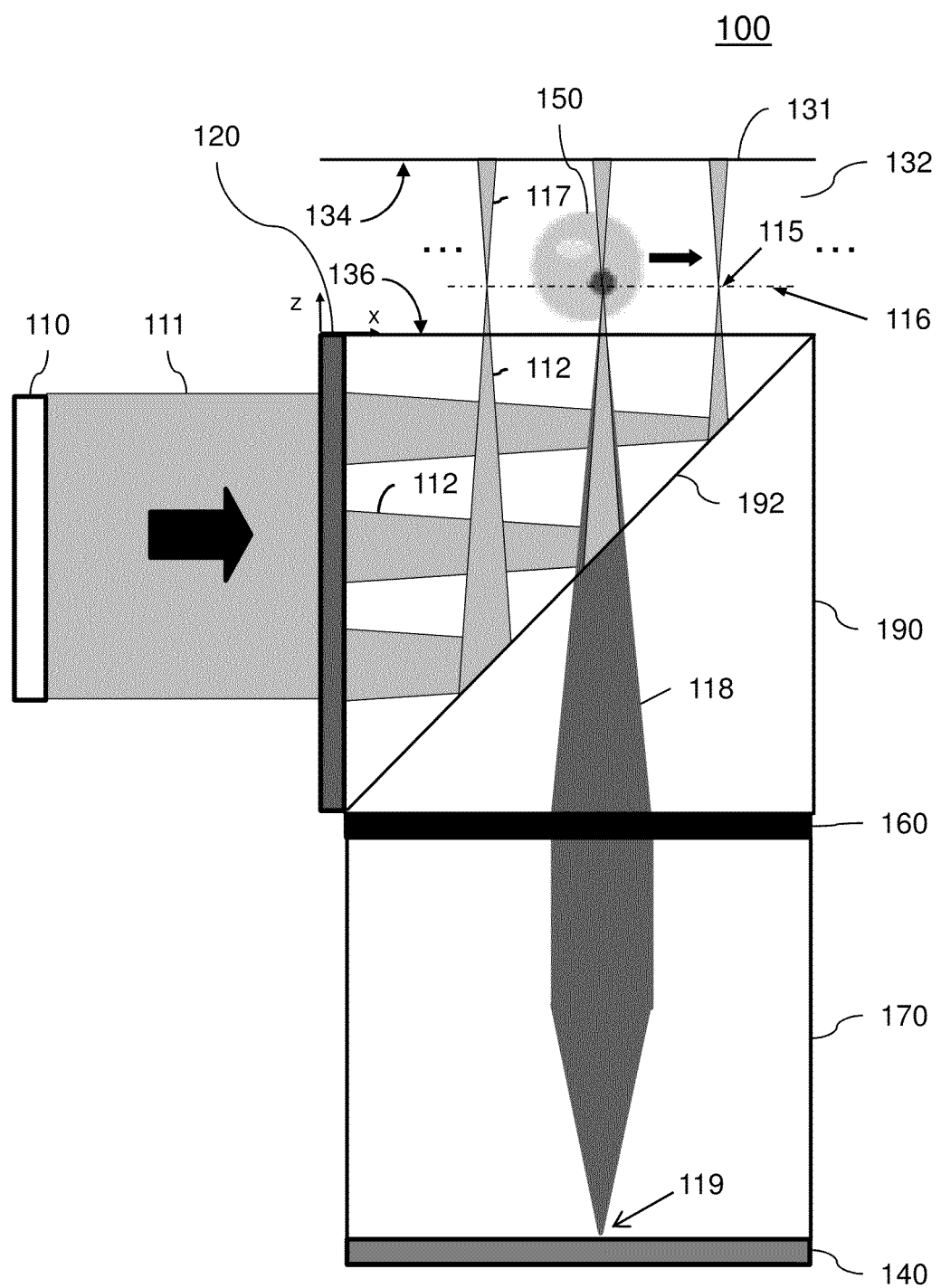
FIG. 5 is a schematic drawing of components of an HIID having a reflective design, according to embodiments of the invention.

FIG. 5 is a schematic drawing of components of a reflective design configuration of an HIID 100 having a beam splitter 190 in the form of a cube, according to embodiments of the invention. The drawing in FIG. 5 is a cross sectional view of the HIID 100 at a line through the focal array of light spots 114.

In FIG. 5, the HIID 100 includes a multi-layered body 131 defining or including a fluid channel 132 having a fluid flow carrying an object 150 being imaged or otherwise analyzed. The fluid channel 132 has a first surface 134 and a second surface 136 on opposite sides of the fluid channel 132. The HIID 100 also includes an x-axis along a longitudinal axis of the fluid channel 132 and a z-axis orthogonal to the x-axis.

The HIID 100 also includes a beam splitter 190 coupled at a first outer surface to the fluid channel 132, a holographic element 120 coupled to a second outer surface of the beam splitter 190, an illumination source 110 providing an illumination beam 111 to the holographic element 120, and an optional differentiating element 160 outside a third outer surface of the beam splitter 190. The first and third surfaces are opposing surfaces of the cube of the beam splitter 190. The beam splitter 190 splits light at a splitting plane 192 located at a 45 degree angle with respect to the x-axis of the fluid channel 132. In the illustrated embodiment, the beam splitter 190 reflects light with properties of the illumination beam 111 and transmits light having other properties. The HIID 100 also includes a collection component 170 coupled to the outside of the differential element 160 and a light detector 140 coupled to the outside of the collection component 170.

In an exemplary operation, the holographic element 120 transforms the planar wavefront of the illumination beam 111 from the illumination source 110 into an array of converging spherical wavefront. In other embodiments, the holographic element 120 may also transform a wavefront, planar or otherwise, from the illumination source 110 into an approximately spherical wavefront or other wavefront having a well separated structure. In the exemplary operation, each volume is hour-glass shaped, forming a focal cone 112 converging to a light spot 115 at the focal plane 116 and spreading to a spreading volume 117. The array of spherical wavefront forms the focal array of light spots 114. Light from the illumination beam 111 is reflected at the splitting plane 192 of the beam splitter 190 and transmitted through the second surface 136 of the fluid channel 132 to form the focal array of light spots 114 in the fluid channel 132. A fluid with the suspended object 150 flows through the fluid channel 132. As the object 150 moves across the focal array 114, the object 150 alters light from each light spot 115. The altered light (e.g., fluorescent emissions) from the site of the light spot 115 is transmitted through the splitting plane 192 of the beam splitter 190. The altered light is in the form of an altered light volume 118. The differentiating element 160 transmits the altered light and the collection component 170 refocuses light into a collection spot 119 at light detector 140.

In the illustrated embodiment, the body 131 is a multi-layer structure having layers of suitable material or combination of materials having any suitable thickness. The layers of the body 131 may also include suitable devices. In the illustrated embodiment, the body 131 defines or includes a fluid channel 132 having any suitable dimensions. The body 131 also includes the beam splitter 190, the differentiating element 160, the collection component 170, and the light detector 140. Other embodiments may integrate, omit, or add one or more layers or change the location of one or more layers in the body 131. For example, the body 131 may also include a layer made of opaque, semi-opaque, or transparent material that lies between the second surface 136 of the fluid channel 132 and the layer with the differentiating element 160 or outside the first surface 134.

The fluid channel 132 may have any suitable dimensions. For example, the height of the fluid channel 132 can range from 1-20 microns and the width can range from 10-500 microns in some cases. In one embodiment, the fluid channel 132 may be sized based on the size of the objects 150 being imaged by the HIID 100. For example, the height of the fluid channel may be sized to be about the diameter of the object 150. The fluid flow in the fluid channel 132 is generally in the direction of the x-axis along a longitudinal axis of the fluid channel 132. Any suitable technique (e.g., pressure drive flow, electrokinetic transport, discrete droplet translocation via electrowetting, thermocapilarity techniques, gravity drive flow, hydrodynamic focusing, dielectrocphoresis, optical tweezing, etc.) may be used for providing fluid flow and particulate transport of the objects 100 in the fluid channel 132. Any suitable control device(s) (e.g., micropumps, direct current (DC) electrokinetic devices, dielectrophoresis electrodes, hydrodynamic focusing channels, etc.) may be used to control the flow of fluid and/or movement of the object 150 through the fluid channel 132.

The illumination source 110 may be a component of the HIID 100 or may be separate from the HIID 100. The illumination source 110 may be provided by any suitable device(s). The illumination source 110 may be placed in any suitable location to generate the appropriate wavefront at the holographic element 120. In the illustrated embodiment, the illumination source 110 provides an illumination beam 111 with the same wavelength, same spatial distribution and/or other light properties, but not necessarily the same intensity, as the reference beam used to record the holographic element 120. In exemplary fluorescence and phosphorescence embodiments, the illumination source 110 provides suitable excitation light having a first light property (e.g., first wavelength) matching the excitation wavelength of the fluorophores in an object 150 being imaged. The fluorophores are excited by the excitation light and emit light (emissions) of a second light property (e.g., second wavelength).

In the illustrated embodiment, the holographic element 120 transforms the planar wavefront of the illumination beam 111 from the illumination source 110 into an array of converging spherical wavefront to form a focal array of light spots 114 at the focal plane 116. In other embodiments, the holographic element 120 may also transform a wavefront, planar or otherwise, from the illumination source 110 into an approximately spherical wavefront or other wavefront having a well separated structure. The holographic element 120 can be made of any suitable materials and have any suitable dimensions (e.g., 1 mm×1 mm, 2 mm×2 mm, ..., 10 mm×10 mm, etc.). The holographic element 120 can be made using any holographic recording technique capable of encoding (recording) data about the focal array of light spots. To play back, the holographic element 120 is illuminated by an illumination beam 111 having the same wavelength, same spatial distribution, but not necessarily the same intensity, as the reference beam used to record the holographic element 120.

In FIG. 5, the focal array of light spots 114 includes a one-dimensional array of light spots 115 located at an angle, α (shown in FIG. 2(b)) with respect to the x-axis. The angle, α can be any suitable angle (e.g., 5 degrees, 10 degrees, 45, degrees, ..., 170 degrees, etc.). Any suitable number of light spots 115 can be used (e.g., 1, 10, 50, 100, 500, etc.). Each light spot 115 can be of any suitable size. Some examples of suitable diameters (FWHM) are 0.4 microns, 0.6 microns, 0.8 microns, 1 micron, etc. In one exemplary embodiment, the light spot diameter is 0.6 microns (FWHM). Any suitable spacing (5 microns, 10 microns, 15 microns, etc.) can be used between the light spots 115. In one exemplary embodiment, a light spot spacing of 20 microns is used.

In the illustrated example, the scanning mechanism 130 employs a microfluidic flow method. The scanning mechanism 130 includes the fluid channel 132 defined by the body 131 and the fluid carrying the object 150 through the fluid channel 132. Although the illustrated embodiment includes a scanning mechanism 130 employing a microfluidic flow method, other methods (e.g., optical tweezing, scanning method, etc.) can be used in other embodiments. For example, one embodiment may have a scanning mechanism 130 that includes a scanning device (e.g., raster scanner, linear scanner, etc.) for scanning the object 150 or specimen stage with the object 150 through light spots 115 or scanning the light spots 115 across or through the object 150.

The light detector 140 detects light and generates signals with time varying light data about the light properties (e.g., intensity, wavelength, frequency, polarization, phase, spin angular momentum, etc.) of the light detected. The light detector 140 can be a single detector, a one-dimensional detector array, or a two-dimensional detector array of light detecting elements 140(a) (shown in FIG. 2(a)). Some examples of single detectors include a photo-diode (PD), an avalanche photo-diode (APD) and a photomultiplier tubes (PMT). Some examples of one-dimensional or two-dimensional detector arrays include a charge coupled device (CCD) array, a complementary metal-oxide-semiconductor (CMOS) array, an APD array, a PD array, a PMT array, etc. In some cases, each light detecting element 140(a) detects light associated with a single light spot 115. In other cases, each light detecting element 140(a) may detect light from more than one light spot 115. In some cases, a plurality (e.g., 2×2 grid, 4×4 grid, etc.) of light detecting elements 140(a) from the two-dimensional array of light detecting elements 140(a) detects light from a single light spot 115. The light detector 140 may be a monochromatic or a color detector. For example, the light detector 140 may be a color light detector that generates light data that can be used to generate color images.

In FIG. 4, the object 150 is shown at a time (t=$t_1$) as the object 150 moves through the fluid channel 132 generally in the x-direction. Although the object 150 is shown as a cell, other embodiments may include other suitable object(s) (e.g. biological and inorganic entities). Any suitable number of objects 150 may be imaged and/or analyzed using the HIID 100.

The body 131 of the HIID 100 may optionally include a differentiating element 160 outside a third outer surface of the beam splitter 190. The differentiating element 160 selectively transmits light altered by the object 150 while substantially removing other remaining light. In fluorescence and phosphorescence applications, a differentiating element 160 may be used to transmit emissions from fluorophores in the object 150 and substantially remove excitation light.

The collection component 170 refers to a device(s) capable of refocusing light associated with each light spot 115 that is transmitted through the differentiating element 160, into a collection spot 119 at one or more light detecting elements 140(a) of the light detector 140. The collection component 170 can include any suitable device or combination of suitable devices (e.g., refractive lens or other diffractive elements). The collection component 170 can refocus light into any suitable light distribution at any suitable plane(s). In the illustrated example, the light distribution is a tightly confined collection spot 119. In other embodiments, the light distribution may be a wider distribution that can be detected by a single light detecting element 140(a) or by a grid of corresponding light detecting elements 140(a).

The beam splitter 190 splits a light beam of a particular type into two or more beams of light of different types (e.g., different wavelengths, different polarizations, etc.). In a fluorescence or phosphorescence application, the beam splitter 190 can be designed to reflect excitation light and transmit emissions. The beam splitter 190 can be of any suitable design form (e.g., cube, half-silvered minor, dichroic mirrored prism, etc.) including any suitable device(s). In FIG. 4, the beam splitter 190 is a cube including two triangular portions. The beam splitter 190 includes a splitting plane 192 at the interface between two triangular portions. In some cases, the splitting plane 192 within the beam splitter 190 may be coated with a dichroic layer which reflects the light of the same type as the illumination beam (e.g., excitation light) and transmit light of other types (e.g., fluorescent emissions).

In one embodiment, the beam splitter 190 can be a polarized beam splitter. In this embodiment, the illumination beam 111 can be excitation light that is linearly polarized and can be reflected by the polarized beam splitter to form the focal array 114. In this example, about 50% of the emission may pass through the polarized beam splitter.

In an exemplary operation, the illumination source 120 provides an illumination beam 111. The holographic element 120 transforms the planar wavefront of the illumination beam 111 into an array of spherical wavefront to form a focal array of light spots 114. In other embodiments, the holographic element 120 may also transform a wavefront, planar or otherwise, from the illumination source 110 into an approximately spherical wavefront or other wavefront having a well separated structure. In the exemplary operation, the light is reflected at the splitting plane 192 located at a 45 degree angle with respect to the x-axis of the fluid channel 132 so that the light spots 115 are formed in the fluid channel 132. As the object 150 moves through the fluid channel 132, the object 150 alters light from each light spot 115. The altered light (e.g., fluorescent emissions) from each light spot 115 is transmitted through the splitting plane 192 of the beam splitter 190. FIG. 5 shows a single object 150 at a specific time (t=$t_1$) altering light at a single light spot 115. At this time, light altered by the object 150 spreads from the site of the light spot 115 in the form of an altered light volume 118. The differentiating element 160 transmits the altered light and removes other light. At this time, the collection component 170 refocuses light altered by the object 150 at a single collection spot 119 at light detector 140. The light detecting elements 140(a)

receive light and generate time varying light data about the light as the object 150 moves through the fluid channel 132. The processor 210 receives a signal with time varying light data and uses the time varying light data to generate line scans associated with the y-locations of the light detecting elements 140(a). Each line scan is associated with a light spot 115. The time varying light data from the light detecting elements 140(a) is dependent on the profile of the object 150 as well as its optical properties. The processor 210 can reconstruct an image of the object 150 by appropriately shifting and assembling the line scans, and optionally other data such as rotation, velocity of the object 150, and changes in shape of the object 150, etc.

The HIID 100 can be used to generate any suitable type of image such as a fluorescence image, phosphorescence image, intensity images, phase image, differential interference contrast (DIC) image, etc. In a fluorescence or phosphorescence imaging example, the HIID 100 provides an illumination beam 111 of excitation light having a first light property that can excite fluorophores in the object 150. The holographic element 120 transforms the wavefront of the illumination source 120 of excitation light into an array of spherical wavefront, approximately spherical wavefront or other wavefront having a well separated structure to form a focal array of light spots 114 of excitation light. The excitation light is reflected by the splitting plane 192 to form the focal array of light spots 114 in the fluid channel 132. The fluid channel 132 has a fluid flow with the object 150 being imaged. The fluorophores absorb excitation light and emit light (emissions) having a second light property different from the first light property. At a specific time ($t=t_1$), an object 150 alters the light from a single light spots 115 as illustrated in FIG. 5. The emissions spread from site of the light spot 115 in the form of an altered light volume 118. In some cases, emissions also spread from the site of the focal cones 112. The splitting plane 192 transmits the emissions and the collection component 170 refocuses the emissions into a collection spot 119 associated with a light spot 115. As the object 150 moves through the fluid channel 132, the light detector 140 detects light and generates time varying light data associated with the received light. The processor 210 receives a signal from the light detector 140 having time varying data and generates one or more fluorescence or phosphorescence images of the object 150 based on the time varying data.

In one embodiment, the holographic element 120 can be replaced by one or more diffractive optical elements (DOE) (e.g., a Freznel zone plate (FZP), diffraction grating, photon sieve, etc.) at the same location illuminated by the illumination beam 111. The DOE diffracts the illumination beam 111 to generate the focal cones 112 and focal array of light spots 114. The DOE can be made of any suitable material and may have any suitable dimensions (e.g., 1 mm×1 mm, 2 mm×2 mm, . . . , 10 mm×10 mm). Using DOEs may be advantageous because they have a high shelf life. DOEs are also suitable for nanofabrication and semiconductor fabrication technique.

E. Configuration 4—Multiple Focal Arrays

The cost and complication of combining multiple HIID 100 illustrated in FIG. 2(a) into a single HIID 100 with multiple focal arrays 114 can be relatively minor in many cases. Having multiple focal arrays 114 in a single HIID 100 may provide one or more advantages. HIID 100 with multiple focal arrays 114 multiplexed in parallel can be used in parallel processing to boost throughput. Other HIID 100 can have focal arrays in series to perform more detailed analysis of the same specimen. For example, an HIID 100 with a series of focal arrays each having a differentiating element 160 that passes a different emission light (e.g., light of a different wavelength) can be used to perform multi-spectral fluorescence imaging. As another example, an HIID 100 with a series of focal arrays at different focal planes 116 can be used to generate sectional images and three dimensional images of an object 150 as shown in FIG. 6.

One design approach for combining multiple HIID 100 into a single HIID 100 with multiple focal arrays 114 in series is to employ a long fluid channel 132 through which can flow a specimen with object(s) 150. The focal arrays 114 can be located separately along the fluid channel 132 to separately image the same specimens. Any suitable spacing between the focal arrays can be used (e.g., 10 microns, 20 microns, etc.).

1. Sectional Imaging and Three-dimensional Imaging

FIG. 6 is an illustrated example of an HIID 100 with multiple focal arrays 114 that can be designed by combining multiple HIIDs 100 of FIG. 2(a) in series into a single HIID 100 employing a long fluid channel 132. FIG. 6 is a schematic drawing of components of an HIID 100 having multiple focal arrays 114 in series at different depths for sectional imaging and/or three-dimensional imaging, according to embodiments of the invention.

In FIG. 6, the HIID 100 includes a three-dimensional focal array of light spots 600 employing a microfluidic flow for generating sectional images (x-y images of the specimen at different z-values) at different depths through a fluid channel 132 and/or generating three-dimensional images, according to embodiments of the invention. The three-dimensional focal array of light spots 600 is comprised of a plurality of n one-dimensional focal arrays 114(1), . . . , 114(n) (n=2, 3, 4, 5, etc.) at different focal planes 116(1), . . . , 116(n) at different depths of the fluid channel 132. The plurality of n focal arrays 114(1), . . . , 114(n) are located at n different depths through the fluid channel 132 and at n different x locations along the longitudinal axis of the fluid channel 132. The HIID 100 can be used to take sectional images of an object 150 at different depths associated with the n focal planes 116(1), . . . , 116(n) during a single pass through the fluid channel 132.

In FIG. 6, the HIID 100 includes a multi-layered body 131 with a holographic element 120 and an illumination source 110 providing an illumination beam 111 at the holographic element 120. The multi-layered body 131 also defines or includes a fluid channel 132 having a fluid flow with the object 150 being imaged. The fluid channel 132 has a first surface 134 and a second surface 136 on opposite sides of the fluid channel 132. The body 131 also includes an optional differentiating element 160 located outside the second surface 136 of the fluid channel 132 and a light detector 140 located outside the differentiating element 160. The differentiating element 160 includes an interference filter 160(a) and an absorption filter 160(b) for removing light having the same light properties as the illumination beam 111.

In the illustrated embodiment, the holographic element 120 transforms the planar wavefront of the illumination beam 111 from the illumination source 110 into n arrays of converging spherical wavefront. Any suitable number can be used for n (e.g., 1, 5, 10, 100, 200, etc.). In other embodiments, the holographic element 120 may also transform a wavefront, planar or otherwise, from the illumination source 110 into an approximately spherical wavefront or other wavefront having a well separated structure.

In the illustrated embodiment, each volume is hour-glass shaped, forming a focal cone 112 converging into a light spot 115 and spreading into a spreading volume 117. The n arrays of spherical wavefront form n focal arrays of light spots 114(1), . . . , 114(n) at corresponding focal planes 116(1), . . . , 116(n). Each of the focal arrays 114(1), . . . , 114(n) includes light spots 115 collectively extending across the fluid channel 132 or across a substantial portion of the fluid channel 132. Each focal array is located at a different focal plane 116(1), . . . , 116(n) at different depths through the fluid channel 132. An object 150 moving through the fluid channel 132 can alter (e.g., block, reduce intensity, change wavelength, or otherwise modify a light property) the light in the fluid channel 132. The altered light is in the form of altered light volumes 118 (shown in FIG. 2(a)). The differentiating element 160 transmits light altered by the object 150. The light detector 140 receives light and generates time varying light data based on the received light as the object 150 moves through the fluid channel 132. A processor 210 (shown in FIG. 1) can use the time varying light data to generate sectional images of the object(s) 150 at different depths associated with the focal planes 116(1) . . . 116(n). Any type of sectional image can be generated such as a fluorescence or phosphorescence image, intensity image, phase image, differential interference contrast (DIC) image, etc.

The HIID 100 also includes an x-axis, a y-axis, and a z-axis. The x-axis and a y-axis lie in the plane of the second surface 136 of the fluid channel 132. The x-axis lies along a longitudinal axis of the fluid channel 132. The z-axis is orthogonal to the x-axis and the y-axis.

In the illustrated example, the body 131 is a multi-layered structure. In other embodiments, the body 131 may be a single, monolithic structure. The layers of the body 131 may include any suitable material or combination of materials having any suitable thickness. The layers of the body 131 may also include suitable devices (e.g., holographic element 120, light detector 140). Although FIG. 6 has certain layers at certain locations, other embodiments of the invention may integrate, omit, or add one or more layers or change the location of one or more layers in the body 131. For example, the body 131 may also include a collection component 170 (shown in FIG. 3) between the fluid channel 132 and the differentiating element 160 or between the differentiating element 160 and the light detector 140 in some embodiments. As another example, the body 131 may also include a layer (e.g., a protective layer) made of opaque, semi-opaque, or transparent material that lies between the second surface 136 of the fluid channel 132 and the layer with the differentiating element 160 or outside the first surface 134.

The fluid channel 132 may have any suitable dimensions. For example, the height of the fluid channel 132 can range from 1-20 microns and the width can range from 10-500 microns in some cases. In one embodiment, the fluid channel 132 may be sized based on the size of the objects 150 being imaged by the HIID 100. For example, the height of the fluid channel may be sized to be about the diameter of the object 150. The fluid flow in the fluid channel 132 is generally in the direction of the x-axis along a longitudinal axis of the fluid channel 132. Any suitable technique (e.g., pressure drive flow, electrokinetic transport, discrete droplet translocation via electrowetting, thermocapilarity techniques, gravity drive flow, hydrodynamic focusing, dielectrocphoresis, optical tweezing, etc.) may be used for providing fluid flow and particulate transport of the objects 100 in the fluid channel 132. Any suitable control device(s) (e.g., micropumps, direct current (DC) electrokinetic devices, dielectrophoresis electrodes, hydrodynamic focusing channels, etc.) may be used to control the flow of fluid and/or movement of the object 150 through the fluid channel 132.

The illumination source 110 may be a component of the HIID 100 or may be separate from the HIID 100. The illumination source 110 may be provided by any suitable device(s). Some suitable devices include light-emitting diodes (LED), laser of suitable wavelength, broadband source (e.g., mercury lamp, halogen lamp, etc.) with a suitable filter, etc. Suitable illumination sources are commercially available. The illumination source 110 may be placed in any suitable location to generate the appropriate wavefront at the holographic element 120. In the illustrated embodiment, the illumination source 110 provides an illumination beam 111 with the same wavelength, same spatial distribution and/or other light properties, but not necessarily the same intensity, as the reference beam used to record the holographic element 120. In exemplary fluorescence and phosphorescence embodiments, the illumination source 110 provides excitation light having a first light property (e.g., first wavelength) matching the excitation wavelength of the fluorophores in an object 150 being imaged. The fluorophores are excited by the excitation light and emit light (emissions) of a second light property (e.g., second wavelength). Some examples of suitable excitation light include fluorescence, 2-photon or higher order fluorescence, Raman, second harmonic or higher order, or other emission mechanism that results in emissions at a different wavelength or other different light property than the excitation light.

The holographic element 120 transforms the planar wavefront of the illumination beam 111 from the illumination source 110 into n arrays of converging spherical wavefront to form n focal arrays of light spots 114(1), . . . , 114(n) at corresponding focal planes 116(1), . . . , 116(n) at different depth through the fluid channel 132. The holographic element 120 can be made of any suitable material(s). The holographic element 120 can have any suitable dimensions (e.g., 1 mm×1 mm, 2 mm×2 mm, 5 mm×2 mm, 10 mm×10 mm, 10 mm×50 mm, etc.). The holographic element 120 can be made using any holographic recording technique capable of encoding (recording) data about the focal array of light spots. To play back, the holographic element 120 can be illuminated by a beam having the same wavelength, same spatial distribution, but not necessarily the same intensity, as the reference beam used to record the holographic element 120.

In FIG. 6, the holographic element forms n one-dimensional focal arrays of light spots 114(1), . . . , 114(n) at different depths through the fluid channel 132 and at different x locations along the fluid channel 132. The n one-dimensional focal arrays of light spots 114(1), . . . , 114(n) form the three-dimensional array of light spots 600. Any suitable number (e.g., 2, 3, 5, 10, 20, 50, 100, etc.) of one-dimensional focal arrays, n can be used. Each one-dimensional focal array 114(i) (i=1 to n) is located at an angle, $\alpha_i$ with respect to the x-axis. The angle, $\alpha_i$ may be any suitable angle (e.g., 5 degrees, 10 degrees, . . . 90 degrees, . . . 170 degrees, etc.). In many cases, all the focal arrays 114(1), . . . , 114(n) will be located at the same angle, $\alpha$ angle. In some cases, the light spots 115 collectively extend diagonally across the fluid channel 132. In other cases, the light spots 115 may collectively extend in a direction parallel to the y-axis and across the fluid channel 132. Although the focal arrays 114 in the illustrated example have three light spots 115, any suitable number of light spots 115 can be used (e.g., 1, 10, 50, 100, 500, etc.) in other embodiments. In some cases, the number of light spots 115 may be determined by the number of light spots 115 needed to collectively extend across a width of the fluid channel 132 where the object(s) 150 being examined flow.

Each light spot 115 can be of any suitable size. Some examples of suitable diameters (FWHM) are 0.4 microns, 0.6 microns, 0.8 microns, 1 micron, etc. In one exemplary embodiment, the light spot diameter is 0.6 microns (FWHM). Any suitable spacing (5 microns, 10 microns, 15 microns, etc.) can be used between the light spots 115. In one exemplary embodiment, a light spot spacing of 20 microns is used.

In the illustrated example, the scanning mechanism 130 employs a microfluidic flow method. The scanning mechanism 130 includes the fluid channel 132 defined by the body 131 and the fluid carrying the object 150 through the fluid channel 132. Although the illustrated embodiment includes a scanning mechanism 130 employing a microfluidic flow method, other methods (e.g., optical tweezing, scanning method, etc.) can be used in other embodiments. For example, one embodiment may have a scanning mechanism 130 that includes a scanning device (e.g., raster scanner, linear scanner, etc.) for scanning the object 150 or specimen stage with the object 150 through light spots 115 or scanning the light spots 115 across or through the object 150.

The light detector 140 detects light and generates signals with time varying light data about the light properties of the light detected. Some examples of light properties that can be detected include intensity, wavelength, frequency, polarization, phase, spin angular momentum, etc. The light detector 140 can be a single detector, a one-dimensional detector array, or a two-dimensional detector array. Some examples of single detectors include a photo-diode (PD), an avalanche photo-diode (APD) and a photomultiplier tubes (PMT). Some examples of one-dimensional or two-dimensional detector arrays include a charge coupled device (CCD) array, a complementary metal-oxide-semiconductor (CMOS) array, an APD array, a PD array, a PMT array, etc. The light detector 140 may be a monochromatic or a color detector. For example, the light detector 140 may be a color light detector that generates light data that can be used to generate color images.

The light detector 140 includes a two-dimensional array of discrete light detecting elements 140($a$) (shown in FIG. 2($a$)) of any suitable size (e.g., 1-10 microns) and any suitable shape (e.g., circular or square). The array is located at an angle, $\alpha$ with respect to the x-axis. Any suitable angle can be used. Any suitable number of light detecting elements 140($a$) may correspond to a light spot 115. In FIG. 6, each light detecting element 140($a$) detects light from a single corresponding light spot 115. In another example, each light detecting element 140($a$) may detect light from more than one light spot 115. In another example, a plurality (e.g., 2×2 grid, 4×4 grid, etc.) of light detecting elements 140($a$) may detects light from a single light spot 115.

In FIG. 6, the object 150 is shown at a time ($t=t_1$) as the object 150 moves through the fluid channel 132 generally in the x-direction. Although the object 150 is shown as a cell, other embodiments may include other suitable object(s) such as biological entities (e.g., whole cells, cell components, microorganisms such as bacteria or viruses, cell components such as proteins, etc.) and inorganic entities. Any suitable number of objects 150 may be imaged and/or analyzed using the HIID 100.

The body 131 of the HIID 100 may optionally include a differentiating element 160 located outside the second surface 136. The differentiating element 160 selectively transmits altered light while substantially removing the remaining light. The differentiating element 160 includes an interference filter 160($a$) and an absorption filter 160($b$). The interference filter 160($a$) transmits the altered light and removes remaining light from the illumination source 110 by interference. The absorption filter absorbs remaining light from the illumination source 110. In fluorescence and phosphorescence applications, a differentiating element 160 may be used to transmit emissions from fluorophores in the object 150 and substantially remove excitation light.

In an exemplary operation, the illumination source 110 provides an illumination beam 111. The holographic element 120 transforms the planar wavefront of the illumination beam 111 from the illumination source 110 into n arrays of converging spherical wavefront. In other embodiments, the holographic element 120 may also transform a wavefront, planar or otherwise, from the illumination source 110 into an approximately spherical wavefront or other wavefront having a well separated structure.

In the exemplary operation, each volume is hour-glass shaped, forming a focal cone 112 converging to a light spot 115 at the focal plane 116 and spreading to a spreading volume 117. The n arrays of converging spherical wavefront forms n focal arrays of light spots 114(1), . . . , 114($n$) at different focal planes 116(1), . . . , 116($n$) at different depths of the fluid channel 132 and at different x locations along the fluid channel 132. The n focal arrays of light spots 114(1), . . . , 114($n$) form the three-dimensional focal array of light spots 600.

During operation, a fluid, within which the object 150 is suspended, flows through the fluid channel 132. As the object 150 flows through the fluid channel 132, the object 150 alters (blocks, reduces intensity, modifies wavelength or other light property or spatial distribution) light in the fluid channel 132 as it passes through one or more of the focal arrays 114(1) . . . 114($n$) located at different depths of the fluid channel 132. The differentiating element 160 transmits the altered light and removes light having the same properties as the illumination beam 111.

The light detecting elements 140($a$) (shown in FIG. 2($a$)) receive light and generate time varying light data about the light as the object 150 moves through focal arrays at different depths of the fluid channel 132. The processor 210 receives a signal with time varying light data associated with each of the focal arrays. The processor 210 uses the time varying light data to generate line scans associated with the y-locations of the light detecting elements 140($a$) for each of the focal arrays. The time varying light data is dependent on the profile of the object 150 as well as its optical properties. The processor 210 can reconstruct a sectional image of the object 150 at a specific depth by appropriately shifting and assembling line scans from time varying data taken by light detecting elements associated with a focal array 114($i$) having a focal plane 116($i$) located at the specific depth. Optionally, other data (e.g., rotation, velocity of the object 150, and changes in shape of the object 150, etc.) can also be used to determine the sectional image. The processor 210 can also construct a three-dimensional image of the object 150 based on the sectional images or the time varying data.

The HIID 100 can be used to generate any suitable type of image such as a fluorescence image, phosphorescence image, intensity images, phase image, differential interference contrast (DIC) image, etc.

In one exemplary embodiment, the HIID 100 can be used in fluorescence or phosphorescence imaging. The specimen with one or more objects 150 may be prepared by mixing a reagent with the specimen. The resulting fluid is introduced into the fluid channel 132 of the HIID 100. The illumination source 110 provides an illumination beam 111 of excitation light having a first light property (e.g., first wavelength, first polarization, etc.) that can excite the fluorophores in the object 150. The holographic element 120 transforms the planar wavefront of the illumination beam 111 of excitation light into n arrays of converging spherical wavefront to form n focal array of light spots 114(1), . . . , 114($n$) of excitation light at n focal planes at different depths through the fluid channel 132 and at different x-locations along the longitudinal axis of the fluid channel 132. In other embodiments, the holographic element 120 may also transform a wavefront, planar or otherwise, from the illumination source 110 into an approximately spherical wavefront or other wavefront having a well separated structure. As the object moves through the fluid channel 132, fluorophores in the object 150 absorb excitation light from a proximal light spot 115 at a particular depth. The fluorophores then emit light (emissions) having a second light property (e.g., a second wavelength, a second polarization, etc.). The emissions spread from site of the proximal light spot 115 in the form of an altered light volume 118. To a lesser extent, the fluorophores may also absorb excitation light from the focal cone 112 and the spreading volume 117. In this case, the fluorophores from these areas may emit light as well.

The differentiating element 160 transmits emissions and substantially removes excitation light. The light detector 140 detects light and generates time varying light data associated with the received light as the object 150 flows through the flow channel 132. The processor 210 receives a signal from the light detector 140 having time varying data. The processor 220 generates one or more fluorescence or phosphorescence sectional images of the object 150 and/or three-dimensional images of the object 150 based on the time varying data.

In one embodiment, the holographic element 120 can be replaced by one or more diffractive optical elements (DOE) (e.g., a Freznel zone plate (FZP), diffraction grating, photon sieve, etc.) at the same location illuminated by the illumination beam 111. The DOE diffracts the illumination beam 111 to generate the focal cones 112 and focal array of light spots 114. The DOE can be made of any suitable material and may have any suitable dimensions (e.g., 1 mm×1 mm, 2 mm×2 mm, ..., 10 mm×10 mm). Using DOEs may be advantageous because they have a high shelf life. DOEs are also suitable for nanofabrication and semiconductor fabrication technique.

2. Multi-Spectral Fluorescence or Phosphorescence Imaging

Another example of an HIID 100 with multiple focal arrays 114 that can be designed by combining multiple HIIDs 100 of FIG. 2(a) in series into a single HIID 100 employing a long fluid channel 132 can be used to perform multi-spectral fluorescence or phosphorescence imaging. In one embodiment, an HIID 100 includes multiple focal arrays arranged in a series at different x-locations along the longitudinal axis of the fluid channel 132. The HIID 100 also includes multiple differentiating elements 160 corresponding to the different focal arrays 114. Each differentiating element 160 transmits light of a different light property (e.g., wavelength, polarization, etc.). For example, a first differentiating element 160 associated with a first focal array 114 may allow light with a wavelength $\lambda_1$ to pass, a second differentiating element 160 associated with a second focal array 114 may allow light with a wavelength $\lambda_2$ to pass, a third differentiating element 160 associated with a third focal array 114 may allow light with a wavelength $\lambda_2$ to pass, etc. In this example, the HIID 100 can generate fluorescence or phosphorescence images from light of wavelengths, $\lambda_1$, $\lambda_2$, and $\lambda_3$. In some cases, different structures in the object 150 being imaged may emit light have different light properties (e.g., $\lambda_1$, $\lambda_2$, $\lambda_3$). In these cases, the HIID 100 may have differentiating elements 160 associated with the different light properties corresponding to the different structures. The HIID 100 can then image the different structures associated with the different light properties.

Figure 7:
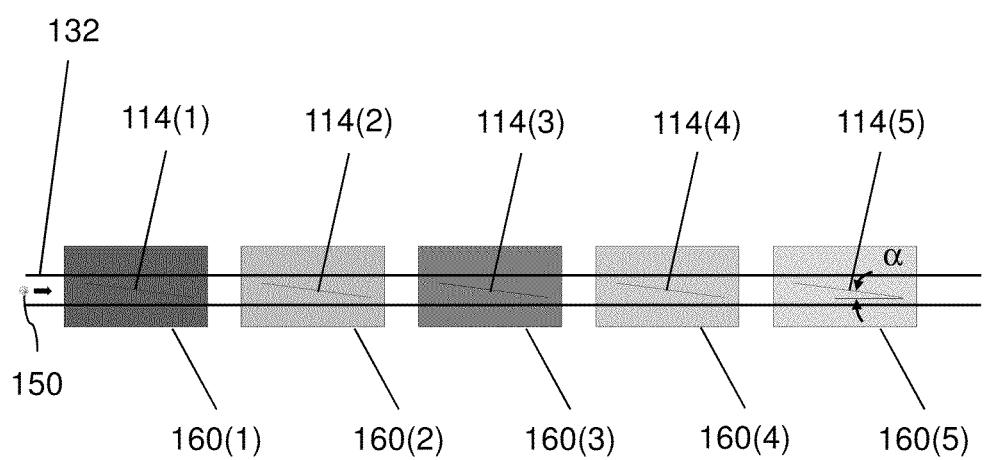
FIG. 7 is a schematic drawing of components of an HIID having multiple focal arrays in series with different differentiating elements for multi-spectral fluorescence or phosphorescence imaging, according to embodiments of the invention.

FIG. 7 is a schematic drawing of components of an HIID 100 having multiple focal arrays 114 in series with different differentiating elements 160 for multi-spectral fluorescence or phosphorescence imaging, according to embodiments of the invention. FIG. 7 is an another illustrated example of an HIID 100 having multiple focal arrays 114 that can be designed by combining multiple HIIDs 100 of FIG. 2(a) in series into a single HIID 100 employing a long fluid channel 132. In this example, the HIID 100 has five differentiating elements 160(1)-160(5) corresponding to the five focal arrays 114(1)-114(5). Each of the differentiating elements 160(1)-160(5) transmits light of a different light property. In this way, a single passage of an object 150 through the fluid channel 132 will allow each segment to acquire a spectrally distinct image.

Embodiments of an HIID 100 including multiple focal arrays in series and corresponding differentiating elements 160 for multi-spectral fluorescence or phosphorescence imaging may have advantages. With conventional microscopes, multi-spectral fluorescence images are typically generated by swapping the chromatic filters between each image acquisition step. As the number of slots in a filter carousel is limited, the acquisition of more than 5 wavelength bands typically requires a carousel swap. With an HIID 100 having a series of focal arrays, the acquisition of multi-spectral images can be implemented automatically by connecting several focal arrays, each sensitive to a particular emission wavelength band, in series. A single passage of an object 150 through the fluid channel 132 generates a complete set of fluorescence or phosphorescence images.

Modifications, additions, or omissions may be made to any of the configurations of the HIIDs 100 without departing from the scope of the disclosure. In some cases, one of more components of any of the HIIDs 100 may be added to other configurations in other embodiments. For example, the collection component 170 can be added to some configurations. In addition, the components of any of the configurations of the HIID 100 may be integrated or separated according to particular needs. For example, the processor 210 may be integrated into the light detector 140 so that the light detector 140 performs all the functions of the processor 210 in some embodiments.

III. Fabrication Techniques

Figure 8A:
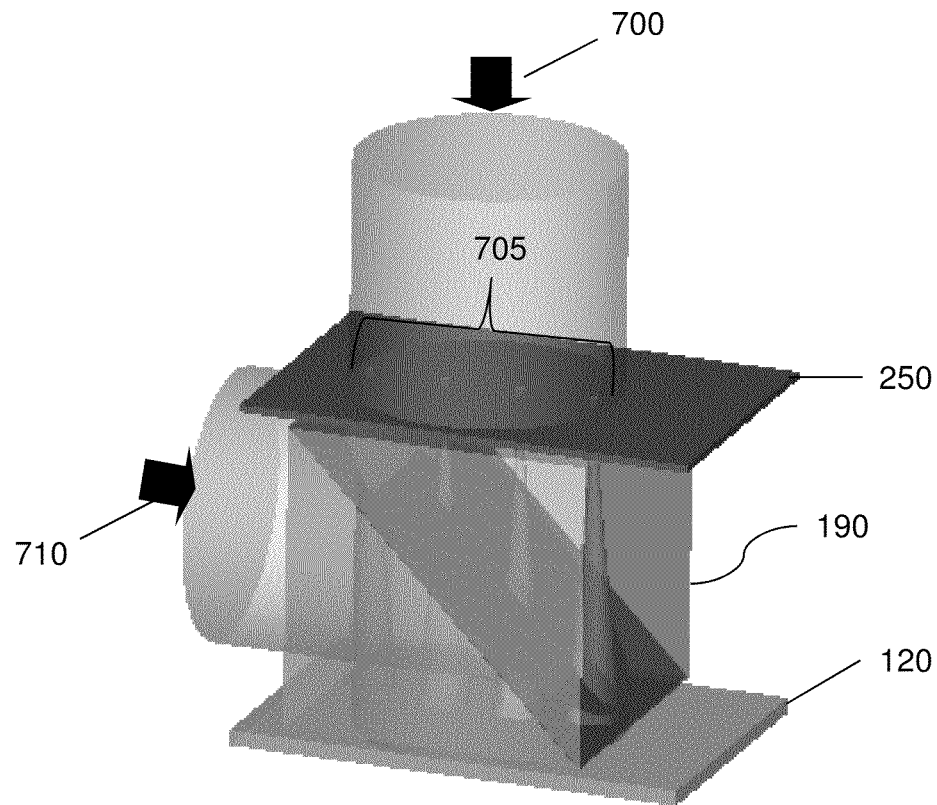
FIG. 8(a) is a schematic drawing of a setup for off axis recording a holographic element, according to embodiments of the invention.

The holographic element 120 can be recorded using any holographic recording technique. One recording method involves interfering a light field 700 through a recording mask having an array of apertures 705 with a collimated reference beam (write beam) 710 via a beam splitter 190, as shown in FIG. 8(a). A recording mask refers to an array of apertures 705 patterned in a layer of metal film or coating on a substrate such as a glass slide. FIG. 8(a) is a schematic drawing of a setup for off-axis recording a holographic element 120, according to embodiments of the invention. In the illustrated setup, a beam splitter 190 is used. In this illustration a recording mask is used. In the illustrated example, the apertures may have an aperture size equal to the desired light spot size and the aperture spacing is equal to the desired spacing between light spots in the focal array of light spots. The interference pattern can then be recorded on the holographic element 120. When the holographic element 120 is illuminated by an illumination beam 111 (shown in FIG. 2(a)) propagating in the opposite direction as the original reference write beam, the holographic element 120 will generate an optical conjugate wave that will reconstitute into a focal array of light spots based on the array of apertures 705.

Figure 8B:
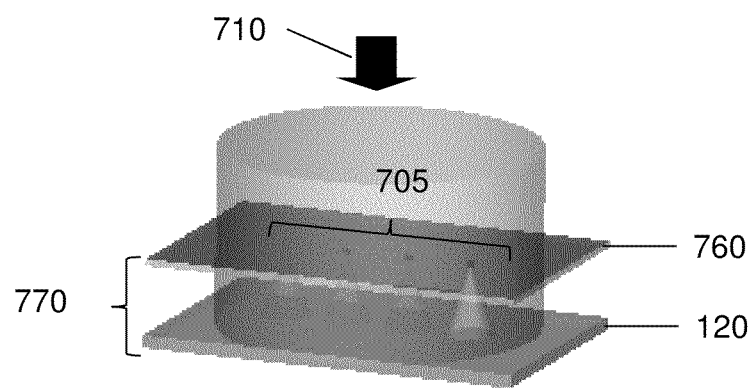
FIG. 8(b) is a schematic drawing of a setup for inline recording a holographic element, according to embodiments of the invention.

Another method is illustrated in FIG. 8(b). FIG. 8(b) is a schematic drawing of a setup for inline recording a holographic element 120, according to embodiments of the invention. In the illustrated embodiment, an incident collimated light beam transmitted through the apertures will interfere with the fairly strong uniform transmission through the metal film/coating (in effect, this serves as the write beam) to create a recordable interference pattern at a short distance away, as shown in FIG. 8(b). The pattern can be recorded by placing the holographic element 120 arbitrarily close to the recording mask 760. This technique allows recording of holographic elements 120 that can generate holograms with excellent stability since there are no potential drifts between the two interfering components. This method for creating a holographic element 120 for generating light spots is easy and readily scalable for mass-manufacture. Using this method, some embodiments of holographic elements 120 have been recorded to generate light spots 115 with diameters of about 0.60 micron and to have 10% efficiency in channeling of the illumination beam 111.

In one embodiment, a silver halide holographic element 120 was recorded using a recording mask 760. After exposure, the holographic element 120 was developed and bleached to produce a phase hologram. A light spot 115 can then be generated by the holographic reconstruction process, where a conjugated collimated beam 710 is transformed into a light spot 115 by the holographic element 120. The focal length between the holographic element 120 and the focal plane 116 (shown in FIG. 2(a)) is the same as the distance 770 between the recording mask 760 and the holographic element 120 during the recording process.

The recording mask can be fabricated using any suitable method. In one example, a specialized mask 760 (shown in FIG. 8(b)) is made to record a holographic element 120 of FIG. 6 with a plurality of n focal arrays 114(1), . . . , 114(n) at different depths. The recording mask 760 is made by starting with a piece of glass and depositing layers of SU-8 photoresist film or other suitable material layer on the glass in a step fashion. For example, each step can be 2 micron high and 50 micron wide. Any suitable step dimensional can be used in other embodiments. Then, a layer of material (e.g., gold) is deposited, with a suitable thickness (e.g., 200 nm thick), on the structure and mill apertures at the appropriate places with a focused ion-beam machine. The recording mask 760 can then be used to record the holographic element 120.

V. Computer Devices

Figure 9:
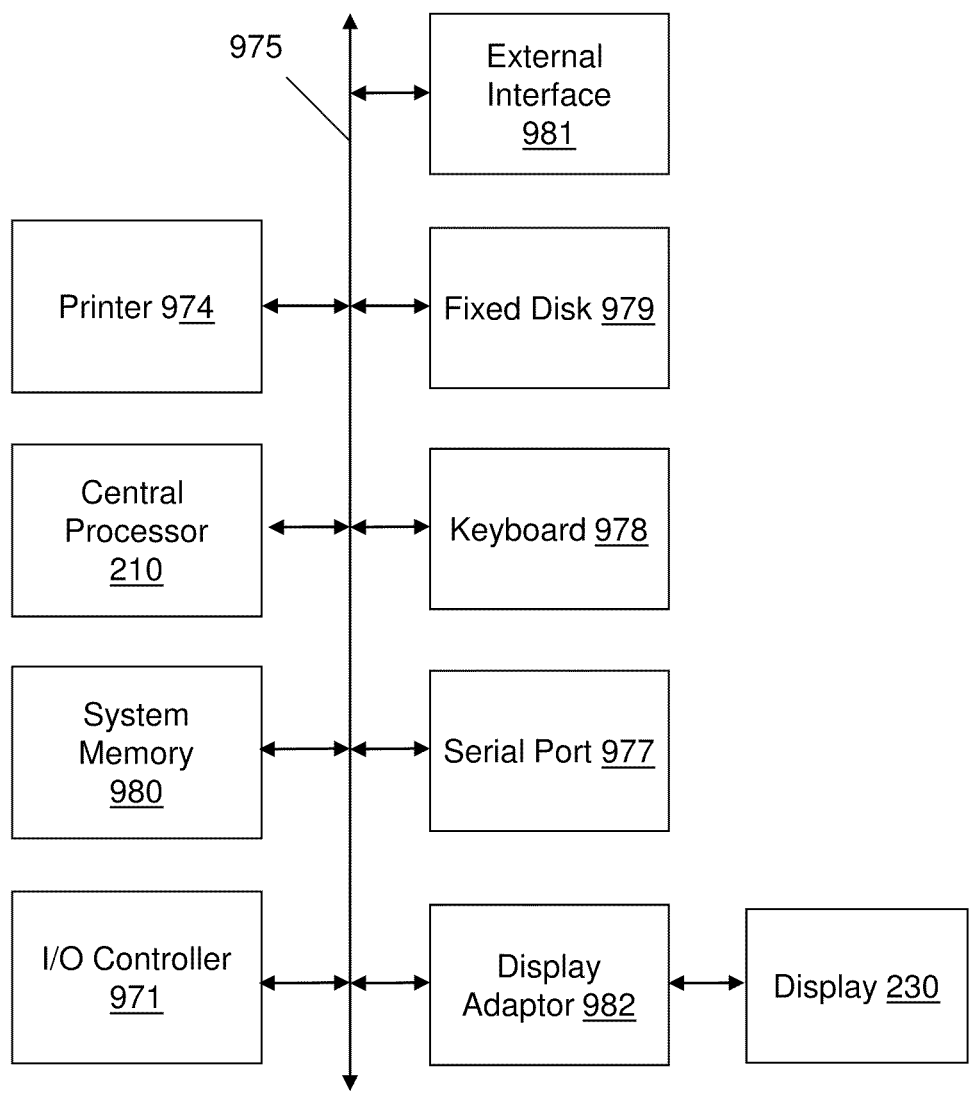
FIG. 9 is a block diagram of subsystems that may be present in computer devices that are used in an HIID system, according to embodiments of the invention.

FIG. 9 shows a block diagram of subsystems that may be present in computer devices that are used in system 10, according to embodiments of the invention. For example, the computer 200 in communication with the HIID 100 may have any suitable combination of components in FIG. 9.

The various components previously described in the Figures may operate using one or more computer devices to facilitate the functions described herein. Any of the elements in the Figures may use any suitable number of subsystems to facilitate the functions described herein. Examples of such subsystems or components are shown in a FIG. 9. The subsystems shown in FIG. 9 are interconnected via a system bus 975. Additional subsystems such as a printer 974, keyboard 978, fixed disk 979 (or other memory comprising computer readable media), display 230, which is coupled to display adapter 982, and others are shown. Peripherals and input/output (I/O) devices, which couple to I/O controller 971, can be connected to the computer system by any number of means known in the art, such as serial port 957. For example, serial port 977 or external interface 981 can be used to connect the computer apparatus to a wide area network such as the Internet, a mouse input device, or a scanner. The interconnection via system bus allows the central processor 210 to communicate with each subsystem and to control the execution of instructions from system memory 980 or the fixed disk 979, as well as the exchange of information between subsystems. The system memory 980 and/or the fixed disk 979 may embody a computer readable medium 220. Any of these elements may be present in the previously described features. A computer readable medium 220 according to an embodiment of the invention may comprise code for performing any of the functions described above.

In some embodiments, an output device such as the printer 974 or display 230 of the HIID system 10 can output various forms of data. For example, the system 10 can output a fluorescence image of an object 150 or other results of analysis.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

All patents, patent applications, publications, and descriptions mentioned above are hereby incorporated by reference in their entirety for all purposes. None is admitted to be prior art.

What is claimed is:

1. A holographically illuminated imaging device, comprising:
  a recorded holographic element that transforms an illumination beam from an illumination source into a focal array of light spots at a plane for illuminating an object being imaged;
  a scanning mechanism that moves the object across one or more light spots in the focal array of light spots to alter light from the one or more light spots;
  a light detector that receives light associated with the focal array of light spots, and that generates light data associated with the received light;
  a differentiating element located between the light detector and the object, and configured to transmit emissions from fluorophores in the object; and
  a processor configured to generate a photoluminescent image of the object based on light data.

2. The holographically illuminated imaging device of claim 1, wherein the processor generates a two-dimensional image of the object based on the light data.

3. The holographically illuminated imaging device of claim 1, wherein the scanning mechanism comprises a fluid channel having a fluid carrying the object through the fluid channel, the light spots collectively and substantially extending across the fluid channel.

4. The holographically illuminated imaging device of claim 1, wherein the scanning mechanism is a scanning device configured to scan the object relative to the focal array of light spots.

5. The holographically illuminated imaging device of claim 1, further comprising a collection component located between the light detector and the object, and configured to collect light at the light detector.

6. A holographically illuminated imaging device, comprising:
   a body defining a fluid channel;
   a recorded holographic element that transforms an illumination beam from an illumination source into a focal array of light spots at a plane for illuminating the object being imaged;
   a beam splitter that reflects light from the focal array of light spots into the fluid channel, wherein a flow in the fluid channel moves an object across one or more light spots in the focal array of light spots to alter light from the one or more light spots, and the beam splitter is adapted to transmit the light altered by the object; and
   a light detector that receives light through the beam splitter, and that generates time varying light data associated with the received light.

7. A holographically illuminated imaging device, comprising:
   a recorded holographic element that transforms an illumination beam into a plurality of focal arrays of light spots for illuminating an object being imaged, wherein each focal array is at a different focal plane;
   a scanning mechanism that moves the object across one or more light spots in the plurality of focal arrays of light spots;
   a light detector that receives light from the plurality of focal arrays of light spots at different focal planes, and that generates light data associated with the received light;
   a differentiating element located between the light detector and the object, and configured to transmit emissions from fluorophores in the object; and
   a processor configured to generate a photoluminescent image of the object based on light data.

8. The holographically illuminated imaging device of claim 7, wherein the processor uses the light data to generate one or more sectional images of the object, wherein each sectional image is of the object at a different focal plane.

9. The holographically illuminated imaging device of claim 7, wherein the processor is configured to generate a three-dimensional image of the object based on the light data.

10. The holographically illuminated imaging device of claim 7,
    wherein the scanning mechanism comprises a fluid channel having a fluid carrying the object through the fluid channel, wherein the focal arrays are located along the fluid channel, and
    wherein the light spots of each focal array collectively and substantially extend across the fluid channel.

11. The holographic illuminated imaging device of claim 7, wherein the scanning mechanism is a scanning device configured to scan the object relative to the plurality of focal arrays of light spots.

12. The holographically illuminated imaging device of claim 7, further comprising a collection component located between the light detector and the object, and configured to collect light at the light detector.

13. A system, comprising:
    a holographically illuminated imaging device including
       a recorded holographic element that transforms an illumination beam from an illumination source into a focal array of light spots at a plane for illuminating an object being imaged,
       a scanning mechanism that moves the object across one or more light spots in the focal array of light spots to alter light from the one or more light spots,
       a light detector that receives light from the focal array of light spots, and that generates light data associated with the received light; and
       a differentiating element located between the light detector and the object, and configured to transmit emissions from fluorophores in the object; and
    a processor in communication with the light detector to receive a signal with the light data, wherein the processor generates a photoluminescent image of the object based on the light data.

14. The system of claim 13, further comprising a display for displaying the image generated by the processor.

15. A holographically illuminated imaging device, comprising:
    a holographic element configured to transform an illumination beam from an illumination source into a focal array of light spots;
    a scanning mechanism configured to move an object across one or more light spots in the focal array of light spots;
    a light detector configured to detect light associated with the focal array of light spots, and generate light data associated with the received light;
    a differentiating element located between the light detector and the object, and configured to transmit emissions from fluorophores in the object; and
    a processor configured to generate a photoluminescent image of the object based on light data.

16. A holographically illuminated imaging device, comprising:
    a holographic element configured to transform an illumination beam into a plurality of focal arrays of light spots at different focal planes;
    a scanning mechanism configured to move an object across one or more light spots in the plurality of focal arrays of light spots;
    a light detector configured to receive light associated with the plurality of focal arrays of light spots, and generate light data associated with the received light;
    a differentiating element located between the light detector and the object, and configured to transmit emissions from fluorophores in the object; and
    a processor configured to generate a photoluminescent image of the object based on light data.

17. The holographically illuminated imaging device of claim 1, wherein the differentiating element is a Fresnel zone plate, a diffraction grating, or a photon sieve.

18. The holographically illuminated imaging device of claim 7, wherein the differentiating element is a Fresnel zone plate, a diffraction grating, or a photon sieve.

* * * * *